US011785662B2

(12) United States Patent
Prakash et al.

(10) Patent No.: US 11,785,662 B2
(45) Date of Patent: Oct. 10, 2023

(54) PROVIDING SESSION CONTINUITY FOR PARALLEL SESSIONS INVOLVING A MULTIPLE UNIVERSAL SUBSCRIBER IDENTITY MODULE USER EQUIPMENT

(71) Applicant: Cisco Technology, Inc., San Jose, CA (US)

(72) Inventors: Aditya Prakash, Bangalore (IN); Ravi Shekhar, Pune (IN); Vimal Srivastava, Bangalore (IN); Amit Shivhare, Gurgaon (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 167 days.

(21) Appl. No.: 17/369,125

(22) Filed: Jul. 7, 2021

(65) Prior Publication Data
US 2023/0010391 A1    Jan. 12, 2023

(51) Int. Cl.
*H04W 76/25* (2018.01)
*H04L 67/145* (2022.01)
(Continued)

(52) U.S. Cl.
CPC .......... *H04W 76/25* (2018.02); *H04L 67/145* (2013.01); *H04W 8/02* (2013.01); *H04W 8/18* (2013.01); *H04W 36/18* (2013.01)

(58) Field of Classification Search
CPC ......... H04W 76/25; H04W 8/02; H04W 8/18; H04W 26/18; H04W 88/06
See application file for complete search history.

(56) References Cited

U.S. PATENT DOCUMENTS

2020/0305211 A1  9/2020  Foti et al.
2021/0112406 A1  4/2021  Jiang et al.
(Continued)

FOREIGN PATENT DOCUMENTS

EP       4007422 A1      6/2022
KR   20210055542 A       5/2021
(Continued)

OTHER PUBLICATIONS

3GPP, 3rd Generation Partnership Project; Technical Specification Group Services and System Aspects; System architecture for the 5G System (5GS); Stage 2 (Release 17), TS 23.501 V17.1.1, Jun. 2021, 526 pages.

(Continued)

*Primary Examiner* — Barry W Taylor
(74) *Attorney, Agent, or Firm* — Edell, Shapiro & Finnan, LLC

(57) ABSTRACT

Presented herein are techniques to provide data session continuity for parallel data sessions involving a multiple Universal Subscriber Identity Module (MUSIM) user equipment (UE). In one example, a method may include obtaining an indication that session continuity for a first session associated with a first data network and a first USIM of a UE is allowed with respect to a second USIM in which the UE communicates first traffic for the first session via the first USIM. The method may further include determining that second traffic for a second session is to be communicated via the second USIM of the UE and, based on the indication that session continuity for the first session is allowed with respect to the second USIM, providing service information to the UE for the first session to enable the UE to communicate both the first traffic and the second traffic via the second USIM.

20 Claims, 10 Drawing Sheets

(51) Int. Cl.
*H04W 8/02* (2009.01)
*H04W 8/18* (2009.01)
*H04W 36/18* (2009.01)

(56) References Cited

U.S. PATENT DOCUMENTS

| | | | | |
|---|---|---|---|---|
| 2021/0136849 | A1* | 5/2021 | Nimmala | H04W 76/12 |
| 2022/0046396 | A1* | 2/2022 | Chiaverini | H04L 12/1407 |
| 2022/0132299 | A1* | 4/2022 | Bhowmik | H04W 76/12 |
| 2022/0159607 | A1* | 5/2022 | Singh | H04W 8/22 |
| 2022/0225276 | A1 | 7/2022 | Xu et al. | |
| 2022/0264503 | A1* | 8/2022 | Starsinic | H04W 8/20 |
| 2022/0295265 | A1* | 9/2022 | Jeong | H04W 12/45 |
| 2022/0303934 | A1* | 9/2022 | Ianev | H04W 60/005 |
| 2022/0353774 | A1* | 11/2022 | Agarwal | H04W 36/14 |

FOREIGN PATENT DOCUMENTS

| | | | |
|---|---|---|---|
| WO | 2020209641 | A1 | 10/2020 |
| WO | 2020247043 | A1 | 12/2020 |
| WO | 2021015598 | A1 | 1/2021 |
| WO | 2021034105 | A1 | 2/2021 |
| WO | 2021034175 | A1 | 2/2021 |
| WO | 2021056574 | A1 | 4/2021 |

OTHER PUBLICATIONS

3GPP, "3rd Generation Partnership Project; Technical Specification Group Services and System Aspects; Telecommunication management; Charging management; 5G system; Services, operations and procedures of charging using Service Based Interface (SBI) (Release 17)", TS 32.290 V17.2.0, Jun. 2021, 38 pages.

3GPP, "3rd Generation Partnership Project; Technical Specification Group Core Network and Terminals; 5G System; Unified Data Management Services; Stage 3 (Release 17)", TS 29.503 V17.3.0, Jun. 2021, 403 pages.

3GPP, "3rd Generation Partnership Project; Technical Specification Group Core Network and Terminals; 5G System; Session Management Services; Stage 3 (Release 17)", TS 29.502 V17.1.0, Jun. 2021.

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 17)", TS 24.229 V17.3.1, Jun. 2021, 1079 pages.

3GPP, "3rd Generation Partnership Project; Technical Specification Group Core Network and Terminals; Mobile radio interface Layer 3 specification; Core network protocols; Stage 3 (Release 17)", TS 24.008 V17.3.0, Jun. 2021.

3GPP, 3rd Generation Partnership Project; Technical Specification Group Services and System Aspects; Policy and charging control framework for the 5G System (5GS); Stage 2 (Release 17), TS 23.503 V17.1.0, Jun. 2021, 137 pages.

3GPP, "3rd Generation Partnership Project; Technical Specification Group Services and System Aspects; Procedures for the 5G System (5GS); Stage 2 (Release 17)", TS 23.502 V17.1.0, Jun. 2021, 692 pages.

Android Open Source Project, "Implementing eSIM", last updated May 4, 2020, 14 pages.

GSM Association, "RSP Technical Specification", SGP.22 Version 2.2, Sep. 1, 2017, 264 pages.

GSM Association, "RSP Architecture", SGP.21 Version 2.2, Sep. 1, 2017, 95 pages.

GSM Association, "Requirements for Multi SIM Devices", TS.37 Version 5.0, Dec. 4, 2018, 45 pages.

Vivo, China Telecom, China Unicom, "Revised WID: Core part: Support for Multi-SIM devices for LTE/NR", 3GPP TSG RAN Meeting #90e, RP-202895, Dec. 7-11, 2020, 5 pages.

Vivo, China Telecom, China Unicom, "Draft new WID: Support for Multi-SIM devices in Rel-17", 3GPP TSG RAN Meeting #86, RP-193165, Dec. 9-12, 2019, 6 pages.

International Search Report and Written Opinion in counterpart International Application No. PCT/US2022/035678, dated Nov. 2, 2022, 30 pages.

LG Electronics, "Corrections to Emergency MUSIM," 3GPP TSG-SA WG1 Meeting #87, S1-192018, Change Request—22.834 CR 0003. Version 17.0.0, Aug. 19-23, 2019, 6 pages.

* cited by examiner

PROVIDING SESSION CONTINUITY FOR PARALLEL SESSIONS INVOLVING A MULTIPLE UNIVERSAL SUBSCRIBER IDENTITY MODULE USER EQUIPMENT

TECHNICAL FIELD

The present disclosure relates to network equipment and services.

BACKGROUND

Networking architectures have grown increasingly complex in communications environments, particularly mobile networking environments. In some cases, a device may have multiple subscription profiles that can be utilized with different sessions. However, for devices having multiple subscription profiles, it can be challenging to manage session continuity across the multiple subscription profiles.

DESCRIPTION OF EXAMPLE EMBODIMENTS

Overview

Figure 1:
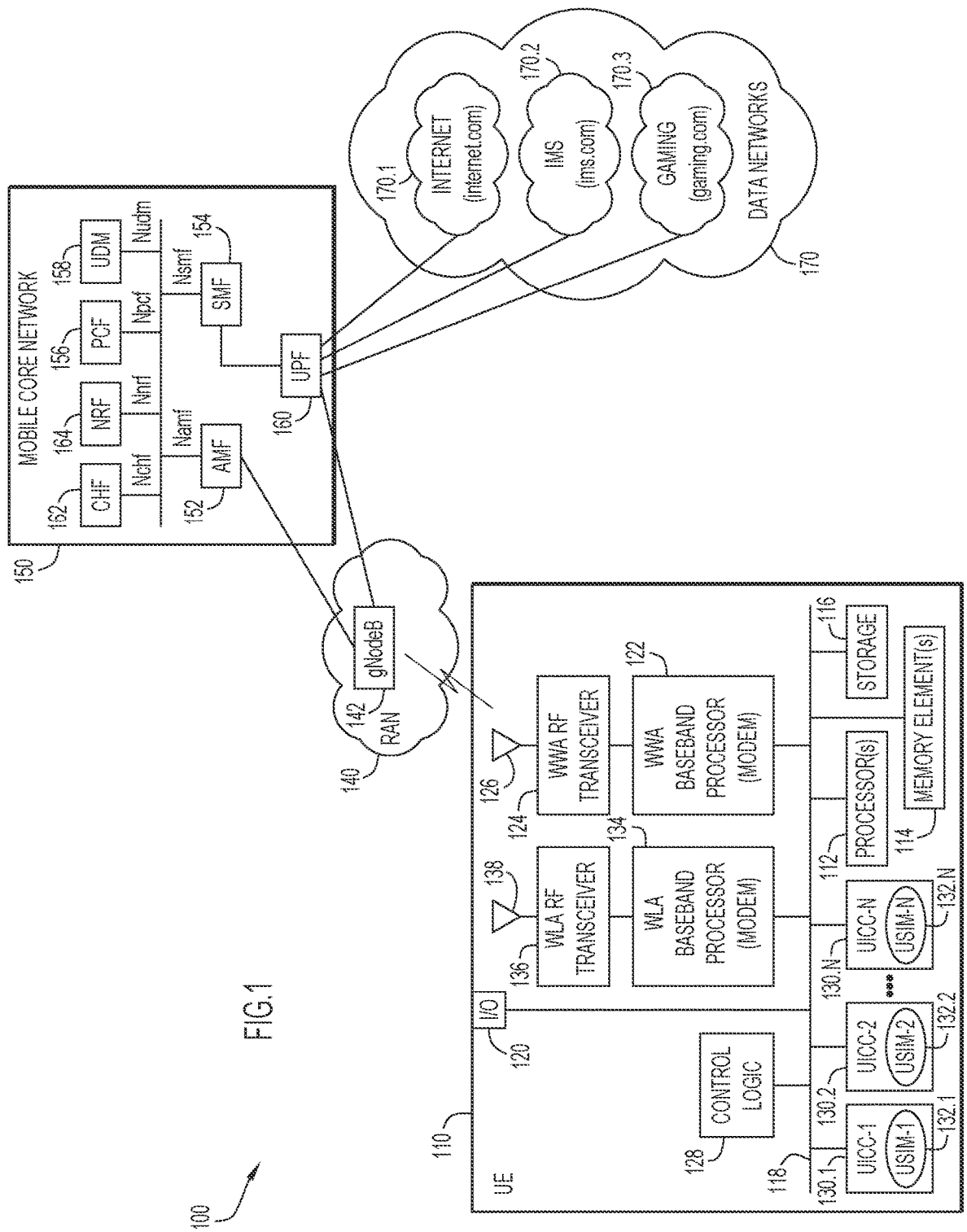
FIG. 1 is a diagram of a system in which techniques may be implemented to provide data session continuity for parallel data sessions involving a multiple Universal Subscriber Identity Module (MUSIM) user equipment (UE), according to an example embodiment.

Presented herein are techniques to facilitate data session continuity for a multiple Universal Subscriber Identity Module (MUSIM) user equipment (UE) that is configured as a wireless wide area (WWA) single receive (Rx)/single transmit (Tx) (referred to herein as 'single Rx/Tx') UE in a 3GPP mobile network, such as a Third Generation Partnership Project (3GPP) Fifth Generation (5G) and/or next Generation (nG) mobile network. For example, the techniques herein may facilitate data session continuity for a WWA single Rx/Tx, MUSIM UE when the UE has a first session involving first traffic for a first data network (e.g., a first data network name (DNN) communicated via a first USIM provided for the UE and there is a parallel session for the UE that is setup for a second USIM provided for the UE for which second traffic is to be communicated. In accordance with embodiments described herein, data session continuity can be maintained for the first traffic for the first data network in association with the second USIM based on an indication included in subscription information or parameters for the UE that indicates that data session continuity is allowed for the first session for the first data network with respect to the second USIM.

In one embodiment, a method is provided that may include obtaining, by a mobility management node, such as an Access and Mobility Management Function (AMF), an indication that session continuity for a first session associated with a first data network and a first universal subscriber identity module (USIM) of the UE is allowed with respect to a second USIM of the UE. If the UE is actively communicating first traffic for the first session via the first USIM and second traffic for a second session is to be communicated for the UE via the second USIM, the method may further include, based on the indication that session continuity for the first session associated with the first data network is allowed with respect to the second USIM, providing, to the UE, service information associated with the first traffic for the first session to enable the user equipment to communicate both of the first traffic for the first session and the second traffic for the second session using the second USIM of the user equipment.

EXAMPLE EMBODIMENTS

As referred to herein, a 3GPP/cellular access network, may be characterized as a wireless wide area (WWA) Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a RAN coverage area within which one or more SIM or Universal SIM (USIM) user equipment may connect to the WWA RAN for access to one or more services that may be provided by a mobile core network, such as service provided by the mobile core network to one or more external data networks (e.g., external to the mobile core network), such as the Internet, the Internet Protocol (IP) Multimedia Subsystem (IMS), a gaming network, and/or the like. A WWA RAN may be differentiated from a wireless local area (WLA) RAN (e.g., an Institute of Electrical and Electronics Engineers (IEEE) 802.11 (e.g., Wi-Fi®) access network, an IEEE 802.15.4a Ultra-Wideband (UWB) access network, etc.) in that the WWA coverage area provided by a WWA radio node (e.g., gNodeB, etc.) is typically larger (sometimes orders of magnitude larger, for example, up to a ratio of 1:5, depending on spectrum and power regulations) than the WLA RAN coverage area provided by a WLA radio node (e.g., a Wi-Fi access point). Additionally, a WWA RAN radio node can typically provide radio access connectivity for a larger number of devices as compared to a WLA RAN radio node.

Further as referred to herein in this Specification, the terms 'multiple USIM', 'multi-USIM', 'MUSIM' and variations thereof may be used interchangeably to refer to a device, such as a user equipment (UE) that includes at least two USIMs in which each USIM may be associated with at least one subscription of a user associated with/operating the UE. MUSIM devices are quite popular as a user may have both a personal and a business subscription supporting in one device, may have two or more personal subscriptions supported in one device for different services (e.g., one individual subscription and one family circle plan subscription), etc.

Supporting MUSIM devices in a 5G mobile core network (5GC or 5GS) is an ongoing 3GPP study item that is focused on studying how 3GPP WWA (e.g., cellular/5G) single receive (Rx) and single transmit (Tx) devices may handle simultaneous sessions. The Global System for Mobile Communications Association (GSMA) TS.37, published Dec. 4, 2018, defines a Dual SIM Dual Standby (DSDS) device, also referred to herein as a WWA (e.g., cellular/5G) single Rx/Tx, MUSIM device or UE, as a UE that may include two SIMS in which both SIMs can be used for an idle mode or idle state network connection, but only one radio connection can be active for one of the USIMs at a time that is in a connected mode. The USIMs in a WWA single Rx/Tx, MUSIM UE share a single WWA Radio Frequency (RF) transceiver. Thus, the single Rx capability for such a WWA single Rx/Tx, MUSIM UE allows the MUSIM UE to receive traffic from only one WWA RAN (e.g., a 3GPP RAN for a 3GPP mobile core network) at one time and the single Tx capability allows the MUSIM UE to transmit traffic to only one WWA RAN at one time. It is to be understood that a WWA single Rx/Tx, MUSIM UE may be capable of communications with multiple data networks (e.g., the Internet, the IMS, etc.) that are external to a 3GPP mobile core network utilizing a WWA single Rx/Tx RF connection with the 3GPP mobile core network.

Thus, an issue related to WWA single Rx/Tx devices is that if a given UE is already in a data session using a first USIM (USIM-1) that is in the connected mode, and the UE receives a downlink high priority call on a second USIM (USIM-2), the UE may switch over to utilize the USIM-2 connection in the connected mode in order to respond to/accept the call and the USIM-1 may move to the idle mode such that the data session for USIM-1 is suspended or released on receiving the call for the USIM-2. It is not possible for a WWA single Rx/Tx device to receive data on two USIM connections simultaneously (i.e., both USIMs cannot both be in the connected mode simultaneously). The behavior for enabling data traffic on a first USIM for a device while the device is on an active call (in connected mode) on a second USIM is an ongoing study item for 3GPP standards. However, there is currently no standardized 3GPP solution that enables a traffic flow to be communicated for a first USIM while a UE is on an active call for a second USIM that is in the connected mode.

Techniques herein provide a solution that addresses the gap in 3GPP standards in order to enable data session continuity for one USIM when there is a parallel session set up on another USIM for a WWA single Rx/Tx, MUSIM UE.

Referring to FIG. 1, FIG. 1 is a block diagram of a system 100 in which techniques may be implemented to provide data session continuity for parallel data sessions involving a WWA single Rx/Tx, MUSIM UE, according to an example embodiment. System 100 may include a UE 110, a Radio Access Network (RAN) 140, and a mobile core network 150. Also shown in system 100 are one or more data network(s) 170.

In at least one embodiment, UE 110 may be any radio device or apparatus implemented as a WWA single Rx/Tx, MUSIM device and may include one or more processor(s) 112, one or more memory element(s) 114, storage 116, a bus 118, and one or more I/O interface(s) 120. UE 110 may also include a WWA baseband processor or modem 122, a single WWA radio frequency (RF) transceiver 124, and one or more antennas or antenna arrays 126 to facilitate a single 3GPP-based (e.g., cellular) Tx/Rx RF connection for UE 110. UE 110 may also include control logic 128, a number Universal Integrated Circuit Card (UICCs) including a first UICC (UICC-1) 130.1 configured with a first USIM (USIM-1) 132.1 associated with a first subscription of the UE 110 (e.g., a subscription for a user associated with/operating the UE 110) and a second UICC (UICC-2) 130.1 configured with a second USIM (USIM-2) 132.2 associated with a second subscription of the UE 110. In some embodiments, any 'N' number of UICCs/USIMs, such as an Nth UICC (UICC-N) 130.N including an Nth USIM (USIM-N) 132.N associated with an Nth subscription for UE 110 may be configured for UE 110. UE 110 may also include a WLA baseband processor or modem 134, a WLA RF transceiver 136, and one or more antennas or antenna arrays 138 to facilitate one or more non-3GPP-based (e.g., Wi-Fi, UWB, etc.) RF connections for UE 110. As referred to herein UE 110 may be referred to interchangeably as 'WWA single Rx/Tx, MUSIM UE 110'.

Although various examples provided herein are discussed with reference to UICCs/USIMs, it is to be understood that techniques/operations discussed for the various examples may also be extended to a MUSIM UE including an electronic or embedded UICC (eUICC) in which multiple electronic SIM/USIM profiles or applications can be stored on the eUICC. Techniques/operations involving a eUICC and multiple electronic SIM/USIM profiles or applications can be performed in a similar manner as described herein for a MUSIM UE.

In at least one embodiment, RAN 140 may include a 3GPP 5G/nG gNodeB 142 (also sometimes referred to as a 'gNB'). Although not illustrated in FIG. 1, RAN 140 may be implemented as a disaggregated virtualized RAN (vRAN) in which gNodeB 142 and/or one or more additional gNodeBs may be disaggregated into one or more radio units, one or more distributed units, and one or more control units in some embodiments. Although not illustrated in FIG. 1, RAN 140 may also include any number of 3GPP 4G/LTE evolved node Bs (eNodeBs or eNB s).

In at least one embodiment, mobile core network 150 may be representative of a 5GC including various network functions (NFs), such as an Access and Mobility Management Function (AMF) 152, a Session Management Function (SMF) 154, a Policy Control Function (PCF) 156, a Unified Data Management (UDM) element 158 (referred to herein interchangeably as 'UDM 158'), a User Plane Function (UPF) 160, a charging function (CHF) 162, and a Network Repository Function (NRF) 164. Although not illustrated, mobile core network 150 may also include any combination of 4G/nG network elements. In some instances, UDM 158 may further interface with a Unified Data Repository (UDR) (not shown).

In various embodiments, the data network(s) 170 of FIG. 1 may be any combination of the Internet data network 170.1, an IMS data network 170.2, a gaming data network 170.3, an Ethernet data network (not shown), Ethernet switching system(s) (not shown), and/or the like. Generally, the IMS may provide for communicating IP multimedia services, such as voice calls (e.g., voice over IP (VoIP)), etc. with UE 110. Generally, gaming data network 170.3 may provide for communicating gaming content (e.g., data, video, audio, etc.) with UE 110. In at least one embodiment, each of the Internet data network 170.1, the IMS data network 170.2, and the gaming data network 170.3 may each be identified via a data network name (DNN) (as referred to per 3GPP standards) for a PDU session that can be established with each DNN (e.g., a DNN of 'internet.com' for Internet data network 170.1, a DNN of 'ims.com' for IMS data network 170.2, and a DNN of 'gaming.com' for gaming data network 170.3).

As illustrated in FIG. 1, gNodeB 142 may interface with AMF 152 and UPF 160. AMF 152 may further interface with SMF 154, which may further interface with UPF 160.

AMF 152 and SMF 154 can each further interface with PCF 156, UDM 158, CHF 162, and NRF 164 via corresponding service-based interface (SBIs), as shown in FIG. 1, facilitating interconnection among the various network functions. Each of PCF 156, UDM 158, CHF 162, and NRF 164 may also interface and access services among each other via the corresponding service-based interfaces-. For example, services corresponding to SMF 154 may be accessed by other element(s) via a corresponding service-based interface Nsmf, AMF 152 services may be accessed by other element(s) via a service-based interface Namf, PCF 156 services may be accessed by other element(s) via a service-based interface Npcf, UDM 158 services may be accessed by other element(s) via a service-based interface Nudm, CHF 162 services may be accessed by other element(s) via a service-based interface Nchf, and NRF 164 services may be accessed by other element(s) via a service-based interface Nnrf. It is to be understood that gNodeB 142 and UPF 160 may also access services of any of the NFs shown FIG. 1.

UPF 160 may also interface with each of the Internet data network 170.1, IMS data network 170.2, and gaming data network 170.3. The UE 110 may interface with gNodeB 142 via an over-the-air RF connection.

In addition to various operations discussed for techniques herein, an AMF, such as AMF 152, may facilitate access and mobility management control/services for one or more UE, such as UE 110, to facilitate an over-the-air RF connection between the UE 110 and the gNodeB 142. In addition to various operations discussed for techniques herein, an SMF, such as SMF 154, may be responsible for UE PDU session management (SM), with individual functions/services being supported on a per-session basis in order to facilitate data transfer(s) between a UE and one or more of data network(s) 170. Generally, a UPF, such as UPF 160, may operate as a Virtual or Virtualized Network Function (VNF) to provide packet routing and forwarding operations for user data traffic and may also perform a variety of functions such as packet inspection, traffic optimization, Quality of Service (QoS), policy enforcement and user data traffic handling (e.g., to/from data network(s) 170), and billing operations (e.g., accounting, etc.) for UE 110 sessions. A UPF, such as UPF 160, is often referred to as an anchor within a mobile core network for a given PDU session involving a given UE, such as UE 110.

Typically, the PCF 156 stores policy data for the system 100 to provide policy control services (e.g., to facilitate access control for UE 110, network selection, etc.). Typically, the UDM 158 stores subscription data for subscribers (e.g., UE 110) that can be retrieved and/or otherwise obtained/utilized during operation of system 100. Typically, the CHF 162 provides support for charging services such as facilitating the transfer of policy counter information associated with subscriber (e.g., UE) spending limits, etc. PCF 156 and UDM 158 may facilitate other operations in accordance with embodiments described herein. Typically, the NRF 164 provides support for NF management (e.g., registering, deregistering, updating services to NFsNF services), NF discovery (e.g., enabling NF service consumer(s) to discover a set of NF instances with a specific NF service/NF type and/or to discover a specific NF service), and NF access (e.g., NF authorization).

A gNodeB, such as gNodeB 142, may implement a WWA (e.g., cellular) air interface and, in some instances also a WLA (e.g., Wi-Fi®) air interface, for any combination of Radio Access Technology (RAT) types (sometimes referred to more generally as 'accesses') for RAN 140 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum WLA accesses such as IEEE 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, gNodeB 142 may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, etc.) through which one or more UE, such as UE 110, may utilize to connect to gNodeB 142 for one or more sessions (e.g., voice, video, data, gaming, combinations thereof, etc.).

A UE, such as UE 110, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100.

In at least one embodiment, processor(s) 112 is/are at least one hardware processor configured to execute various tasks, operations and/or functions for UE 110 as described herein according to software and/or instructions configured for UE 110. Processor(s) 112 (e.g., hardware processor(s)) can execute any type of instructions associated with data to achieve the operations detailed herein. In one example, processor(s) 112 can transform an element or an article (e.g., data, information) from one state or thing to another state or thing.

In at least one embodiment, memory element(s) 114 and/or storage 116 is/are configured to store data, information, software, and/or instructions associated with UE 110, and/or logic configured for memory element(s) 114 and/or storage 116. For example, any application and/or logic described herein (e.g., control logic 128) can, in various embodiments, be stored for UE 110 using any combination of memory element(s) 114 and/or storage 116. Note that in some embodiments, storage 116 can be consolidated with memory element(s) 114 (or vice versa), or can overlap/exist in any other suitable manner.

In at least one embodiment, bus 118 can be configured as an interface that enables one or more elements of UE 110 to communicate in order to exchange information and/or data. Bus 118 can be implemented with any architecture designed for passing control, data and/or information between processors, memory elements/storage, peripheral devices, and/or any other hardware and/or software components that may be configured for UE 110. In at least one embodiment, bus 118 may be implemented as a fast kernel-hosted interconnect, potentially using shared memory between processes (e.g., logic), which can enable efficient communication paths between the processes. I/O interface(s) 120 allow for input and output of data and/or information with other entities that may be connected to UE 110. For example, I/O interface(s) 120 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 128 can include instructions that, when executed, cause processor(s) 112 to perform operations, which can include, but not be limited to, providing overall control operations of UE 110; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The WWA RF transceiver 124 may perform RF transmission and RF reception of WWA signals (e.g., 5G/NR signals) via antenna(s)/antenna array(s) 126, and the WWA baseband processor (modem) 122 performs baseband modulation and demodulation, etc. associated with such signals to enable WWA (e.g., cellular, 5G/NR) communications for UE 110.

The one or more WLA RF transceiver(s) 136 may perform RF transmission and RF reception of WLA signals (e.g., Wi-Fi signals) via antenna(s)/antenna array(s) 138 and the WLA baseband processor(s) (modem(s)) 134 perform baseband modulation and demodulation, etc. associated with such signals to enable WLA (e.g., Wi-Fi) communications for UE 110.

Generally, a UICC may be considered a physical/hardware element that includes, at least in part, a USIM in which the USIM may be considered an application or logic that runs on the UICC and may manage authentication functions and the radio connection mode (idle mode or connected mode) for one or more protocol data unit (PDU) session(s) that may be established for a given subscription associated USIM provided for the UE. As referred to herein, the terms 'USIM application', 'USIM logic', and variations thereof (e.g., USIM-1, USIM-2, etc.) can be used interchangeably to refer to a USIM application or logic that may perform one or more operations in association with various embodiments described herein. For example, USIM-1 132.1 may manage authentication functions (e.g., registration) and the radio connection mode at least for one or more PDU session(s) that may be established for a first subscription associated with USIM-1 132.1 for UE 110. Similarly, USIM-2 132.2 may manage authentication functions (e.g., registration) and radio connection mode at least for one or more second PDU session(s) that may be established for a second subscription associated with USIM-2 132.2 for UE 110.

As noted above, the USIMs in a single Rx/Tx, MUSIM UE, such as UE 110, share a single transceiver, such as RF transceiver 124 such that the single Rx capability for UE 110 allows the UE 110 to receive traffic from only one SIM-based network (e.g., 3GPP mobile core network 150) at one time and the single Tx capability allows the MUSIM UE to transmit traffic to only one SIM-based network (e.g., 3GPP mobile core network 150) at one time.

However, in accordance with embodiments herein, various operations provided via system 100 may enable UE 110 to communicate traffic flows for multiple, parallel PDU sessions utilizing one of USIM-1 132.1 or USIM-2 132.2 based on data session continuity information that may be provided for subscription information/parameters for the UE 110 configured or otherwise provisioned within UDM 158, as discussed herein below with reference at least to FIGS. 2-3, that may enable communications for a PDU session for a particular USIM that is to be switched from the connected mode to the idle mode to be transferred to another USIM that is to be switched from the idle mode to the connected mode.

Thus, techniques herein may provide for the ability to maintain data session continuity for parallel PDU sessions involving a single Rx/Tx, MUSIM UE such that the communications involving a first PDU session associated with a first USIM that is to be switched to the idle mode can be transferred to a second USIM that is to be switched to the connected mode such that the communications involving the first PDU session can be continued via the second USIM based on data session continuity information associated with the first PDU session that indicates that data session continuity for the first PDU session is allowed with respect to the second USIM.

As referred to herein, multiple USIMs of a device/UR that can allow or disallow PDU session movement between the multiple USIMs are referred to as 'Buddy SIMs' (also referred to herein as 'B Sims', 'Buddy SIMs', 'Buddy Sims', and variations thereof). In at least one embodiment, a data session continuity flag, referred to herein using the label 'PduTxToBSimEnabled', can be stored in subscription information within UDM 158 (and/or a UDR) for a given UE for which data session continuity features may be provided. It is to be understood that the label 'PduTxToBSimEnabled' for the data session continuity flag is provided for illustrative purposes only and is not meant to limit the broad scope of the present disclosure. Other labels can be envisioned.

In at least one embodiment, the data session continuity flag could be set to 'True', '1', or the like to indicate that data session continuity is allowed for a given PDU session or could be set to 'False', '0', or the like to indicate that data session continuity is not allowed for a given PDU session. In one embodiment, the flag indicating data session continuity to Buddy SIM for a given PDU session could be set as one flag per DNN (e.g., allow for DNN 'internet.com' but disallow for DNN 'gaming.com'). In another embodiment, the flag could be set on a subscription basis such that for a given subscription the flag could be set to indicate that data session continuity is allowed or disallowed for all DNNs associated with the given subscription. Other variations for indicating whether session continuity may be allowed or disallowed for one or more PDU sessions can be envisioned.

Figure 2A:
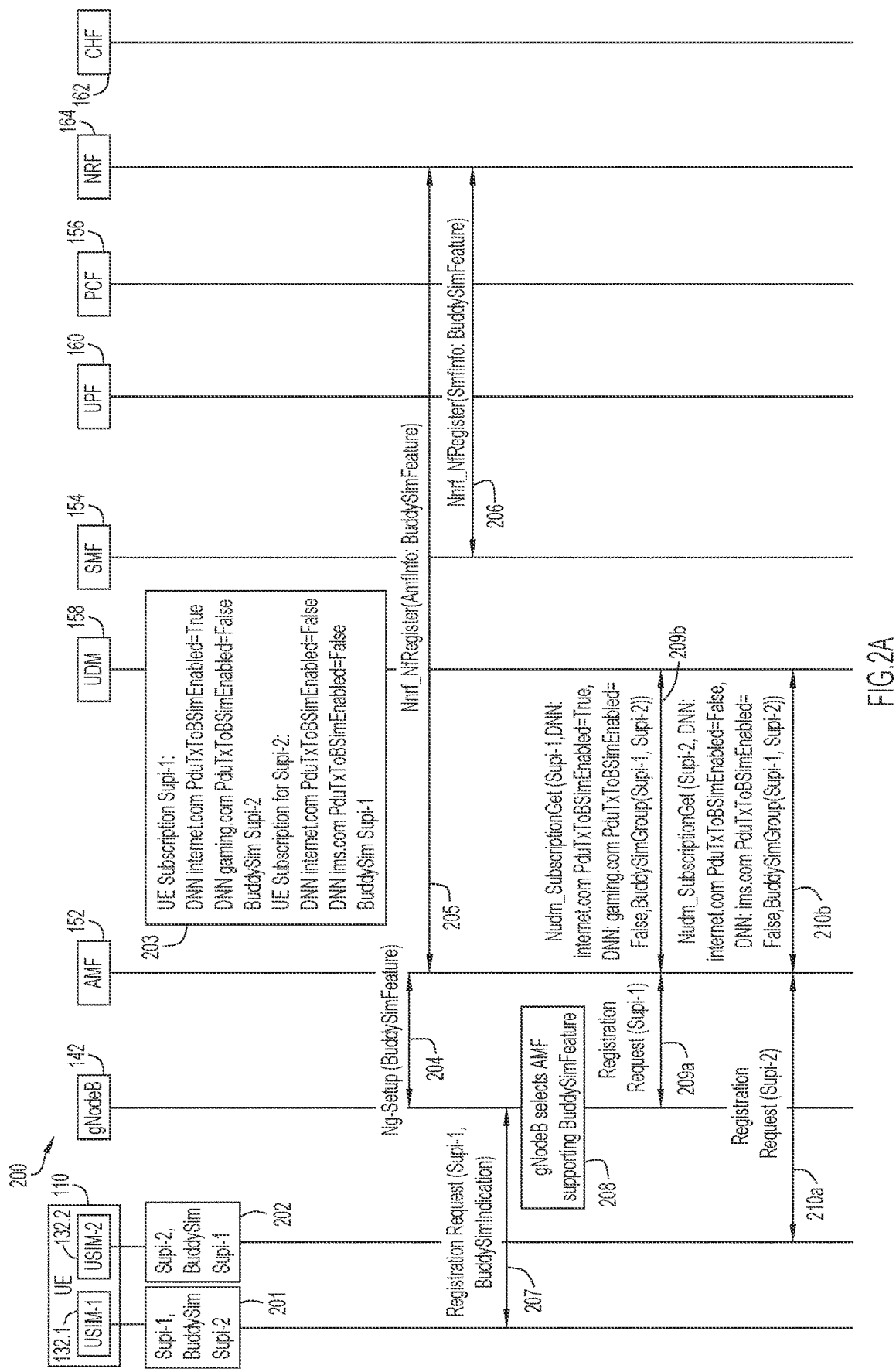
FIGS. 2A, 2B, and 2C are a message sequence diagram illustrating a call flow associated with providing data session continuity for parallel data sessions involving a MUSIM UE, according to an example embodiment.
Figure 2B:
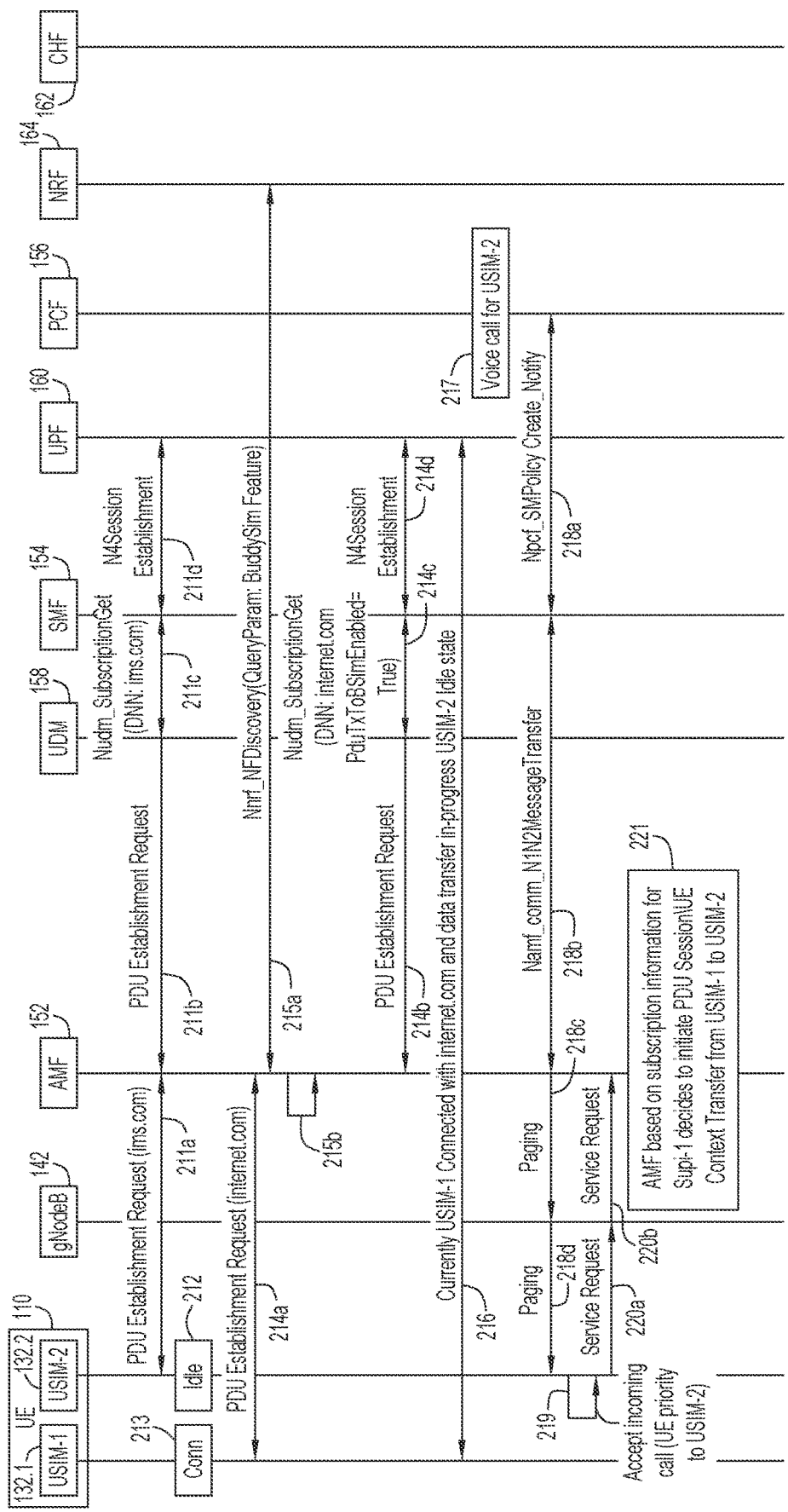
Figure 2C:
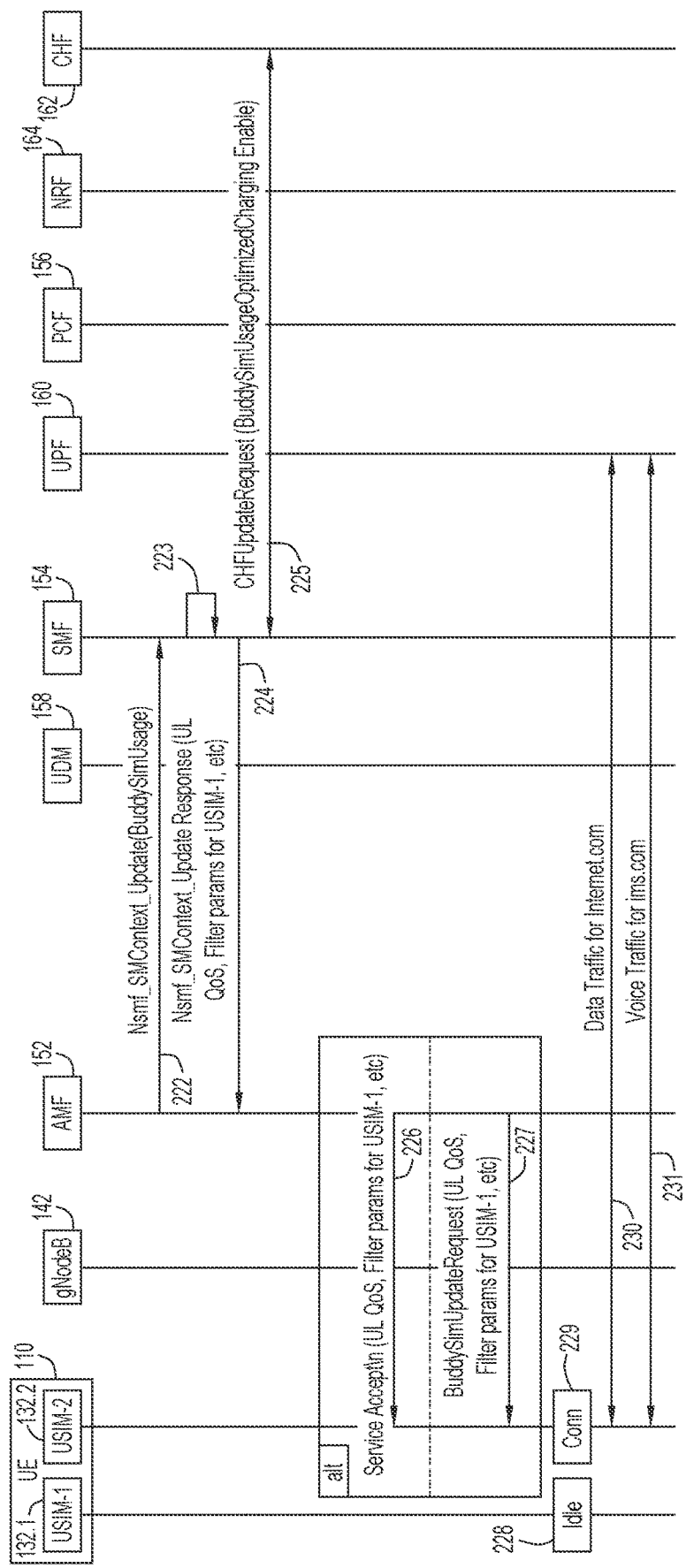

Consider various example operational details discussed with reference to FIGS. 2A, 2B, and 2C in which FIGS. 2A, 2B, and 2C is a message sequence diagram illustrating a call flow 200 associated with providing data session continuity for parallel PDU sessions involving a WWA (e.g., 5G/NR) single Rx/Tx, MUSIM UE, such as UE 110, according to an example embodiment. FIGS. 2A-2C include UE 110 including USIM-1 132.1 and USIM-2 132.2 (note, UICC-1 130.1 and UICC-2 130.2 are not shown in FIGS. 2A-2C for purposes of brevity only), gNodeB 142, AMF 152, SMF 154, PCF 156, UDM 158, UPF 160, CHF 162, and NRF 164.

Generally, call flow 200 illustrates various operations that can be performed to facilitate data session continuity from one USIM (USIM-1 132.1, for call flow 200) to another USIM (USIM-2 132.2, for call flow 200). For call flow 200, it is assumed that USIM-1 132.1 and USIM-2 132.2 are associated with a same operator/service provider; however, if the USIMs were associated with different operators/ service providers, then operator/service provider agreements could be utilized to enable the data session continuity features described herein.

As shown at 201, USIM-1 132.1 is associated with a first subscription identifier for UE 110, such as a first Subscription Permanent Identifier (SUPI), SUPI-1, for a first subscription for UE 110 and USIM-2 132.2 is associated with a second SUPI, SUPI-2, for a second subscription for UE 110, as shown at 202. Generally, a SUPI, as defined in 3GPP Technical Specification (TS) 23.501 is a globally unique identifier, which can be allocated to uniquely identify a 5G subscriber for a given subscription in which the SUPI is typically in stored the USIM configured for the UE of the subscriber. In some instances, an International Mobile Subscriber Identity (IMSI) or a Network Address Identifier (NAI) can be used as a SUPI. The SUPI for each of a corresponding subscription of a given subscriber/UE is also stored in the UDM 158 along with other subscription information for each corresponding subscription, as discussed in further detail, below. As shown at 201 and 202, both of USIM-1 132.1 and USIM-2 132.2 are configured to be Buddy SIMs of each other for UE 110 such that the SUPI-2 is identified as the BuddySIM for USIM-1 132.1/SUPI-1 (201) and SUPI-1 is identified as the BuddySIM for USIM-2 132.2/SUPI-2 (202). The UE 110 is provided with the configuration of BuddySIM information to enable each USIM to accept data session(s) from the other USIM, if allowed, depending on the UE subscription configuration for various PDU sessions, as discussed in further detail below.

The allowance or denial of data session continuity for parallel data sessions services can be controlled through the user subscription for UE 110 as provisioned for UDM 158, as shown at 203, in which UDM 158 includes subscription information for UE 110 for both of USIM-1 132.1/SUPI-1 for the first subscription for UE 110 and USIM-2 132.2/SUPI-2 for the second subscription for UE 110. The subscription information includes BuddySIM group details that identify SUPIs for corresponding USIMs belonging to a BuddySIM group for UE 110. For example, the first subscription associated with SUPI-1 identifies (among other information discussed in further detail below) that the BuddySIM SUPI associated with the first subscription is SUPI-2 corresponding to USIM-2 132.2 as the BuddySIM of USIM-1 132.1. Further, the second subscription associated with SUPI-2 identifies (among other information discussed in further detail below) that the Buddy SIM SUPI associated with the second subscription is SUPI-1 corresponding to BuddySIM USIM-1 132.1 as the BuddySIM of USIM-2 132.2. Thus, the BuddySIM group for the UE 110 subscriptions includes SUPI-1 (corresponding to USIM-1 132.1) and SUPI-2 (corresponding to USIM-2 132.2) for this example.

Further, the subscription information configured at 203 can include DNN information indicating whether a given data session (e.g., a given PDU session) associated with a particular USIM/SUPI can or cannot be transferred to the BuddySIM (as identified via the BuddySIM SUPI indication) via a setting provided for the PduTxToBSimEnabled data session continuity flag that may be provided for each DNN identified in each subscription for the UE 110. For example, the subscription information for UE 110 for the present example at 203 identifies, for the first subscription associated with SUPI-1, that a PDU session for DNN internet.com can be transferred to the BuddySIM, USIM-2 132.2 in this example corresponding to SUPI-2, as identified in the first subscription, by setting the data session continuity flag for DNN internet.com to be 'PduTxToBSimEnabled=True', whereas the first subscription identifies that a PDU session for DNN gaming.com cannot be transferred to the BuddySIM (USIM-2 132.2) by setting the data session continuity flag for DNN gaming.com to be 'PduTxToBSimEnabled=False'.

The subscription information for UE 110 for the present example at 203 further identifies, for the second subscription associated with SUPI-2, that a PDU session for DNN internet.com cannot be transferred to the BuddySIM, USIM-1 in this example corresponding SUPI-1, as identified in the second subscription, by setting the data session continuity flag for DNN internet.com to be 'PduTxToBSimEnabled=False' and also that a PDU session for DNN ims.com can also not be transferred to the BuddySIM (USIM-1) by also setting the data session continuity flag for DNN gaming.com to be 'PduTxToBSimEnabled=False'. By providing one or more data session continuity flag(s) within subscription information for one or more UE control of data session continuity may be afforded to mobile core network operators. For example, consider a case in which data session transfer from a personal USIM to a business/enterprise USIM is allowed, but not vice-versa (e.g., due to security concerns etc.). By providing data session continuity information within subscription information for UEs, mobile core network operators can control security concerns, privacy concerns, etc. for subscribers.

The gNodeB 142 typically selects an AMF to handle a registration request for a given UE. For the embodiment of FIGS. 2A-2C, it is assumed that gNodeB 142 selects AMF 152 to handle traffic for UE 110, however, in at least one embodiment, gNodeB 142 may be provided with information regarding which of one or more AMFs of a mobile core network may support the data session continuity operations as described herein such that selection of an AMF may be dependent on the AMF supporting data session continuity functionality.

For example, in at least one embodiment as shown at 204, AMF 152 can exchange a capability information with gNodeB 142 indicating that AMF 152 supports a data session continuity capability (shown in FIG. 2A as a 'BuddySimFeatures' capability indication) in order to perform session continuity operations as discussed herein. In some embodiments, gNodeB 142 may be locally configured with information that identifies whether each AMF supports or does not support a data session continuity capability to perform session continuity operations as described herein, which can facilitate AMF selection by the gNodeB 142 for the UE 110 registration.

NRF 164 can also be enhanced to store capability information for multiple AMFs as well as multiple SMFs/UPFs (e.g., slices) that may be provided via mobile core network 150 in which the capability for each AMF and each SMF/UPF/slice can identify whether corresponding network functions (AMFs/SMFs/UPFs) support a data session continuity capability to perform the enhanced data session continuity operations as discussed herein. In at least one embodiment, as shown at 205, AMF 152 may also perform a registration exchange with NRF 164 to indicate its data session continuity capability to NRF 164 (e.g., via a 'BuddySimFeatures' capability indication) such that NRF 164 stores the capability indication along with other AMF information (AMFinfo) stored/maintained by NRF 164 for AMF 152 (e.g., IP address, AMF set identifier, AMF region identifier, AMF pointer, etc.).

In one embodiment as shown at 206, SMF 154 may also perform a registration exchange with NRF 164 to indicate its data session continuity capability to NRF 164 (e.g., via a 'BuddySimFeatures' capability indication) such that NRF 164 stores the capability indication with other SMF information (SMFinfo) stored/maintained by NRF 164 for SMF 154 (e.g., IP address, SMF set identifier, etc.)

In one embodiment, as shown at 207, UE 110 may initiate a registration request for the first subscription of UE 110 in which the registration request includes capability information for UE 110 that indicates that UE 110 supports a data session continuity capability in order to facilitate operations as described herein (e.g., Registration Request (SUPI-1, BuddySimIndication), as shown at 207). The capability information provided by the UE 110 via the 'BuddySimIndication' may be one or more information elements (IEs) or the like (similar to how the UE 110 can provide Network Slice Selection Assistance Information (NSSAI)) to enable the gNodeB 142 to select an appropriate AMF that supports session continuity operations. For example, as shown at 208 of FIG. 2A, gNodeB 142 can select AMF 152 to handle access and mobility management for UE 110 based, at least in part, on gNodeB 142 identifying that AMF 152 supports the data session continuity capability (e.g., BuddySimFeature) as indicated to gNodeB 142 at 204 by AMF 152, in at least one embodiment.

As part of the registration procedure for UE 110 for USIM-1 132.1 and for USIM-2, 132.2, the AMF 152 may obtain subscription information for the USIM along with BuddySim group information and data session continuity information for each of one or more DNN(s) identified in subscription information for UE 110 for each USIM.

For example, continuing to 209a, the gNodeB 142 forwards the registration request to selected AMF 152, which authenticates UE 110 for the first subscription and obtains the first subscription information (Nudm_SubscriptionGet) for SUPI-1 via UDM 158, as shown at 209b. The first subscription information for SUPI-1, as discussed above at 203, includes the data session continuity information for DNN internet.com indicating that data session continuity is allowed ('PduTxToBSimEnabled=True') with respect to the BuddySIM, USIM-2 132.2 in this example, and for DNN gaming.com indicating that data session continuity is not allowed ('PduTxToBSimEnabled=False') with respect to the BuddySIM. The BuddySIM group information for UE 110 identifying SUPI-1 (for USIM-1 132.1) and SUPI-2 (for USIM-2 132.2), such as 'BuddySIMGroup(SUPI-1, SUPI-2)', as BuddySIMs for each other is also identified to the AMF 152 along with the first subscription information.

Further, at 210a and 210b, consider that the UE 110 via USIM-2 132.2 initiates a registration request for the second subscription of UE 110 with AMF 152, which authenticates UE 110 for the second subscription and obtains the second subscription information for SUPI-2 via UDM 158. The second subscription information for SUPI-2, as discussed above at 203, includes the data session continuity information for DNN internet.com indicating that a data session continuity is not allowed ('PduTxToBSimEnabled=False') with respect to the BuddySIM, USIM-1 132.1 in this example, and also for DNN ims.com indicating that data session continuity is not allowed ('PduTxToBSimEnabled=False') with respect to the BuddySIM, USIM-1 132.1. The BuddySIM group information for UE 110 identifying SUPI-1 (for USIM-1 132.1) and SUPI-2 (for USIM-2 132.2) as BuddySIMs for each other is also identified to the AMF 152 along with the second subscription information. It is to be understood that the order of registrations involving USIM-1 132.1 and USIM-2 132.2 can be performed in any order.

Following registration, at least one PDU session can be established for each USIM for UE 110. As part of the PDU session establishment procedure for UE 110 for a given PDU session for each of USIM-1 132.1 and USIM 132.2, the SMF 154 may also obtain BuddySIM information for the given PDU session that identifies whether data session continuity is allowed or is not allowed for the given PDU session. For example, at 211a of FIG. 2B, consider that UE 110 via USIM-2 132.2 initiates a PDU session establishment request via AMF 152, which communicates the request to SMF 154, as shown at 211b, for the DNN ims.com for a data session to be established for the IMS data network 170.2 (not shown in FIGS. 2A-2C). Although not shown in FIG. 2B, it is to be understood that USIM-1 132.1 is in the idle mode and USIM-2 132.2 is on the connected mode for the PDU session establishment involving USIM-2 132.2. Obtaining the PDU session request triggers SMF 154, at 211c, to obtain the second subscription information associated with USIM-2 132.2/SUPI-2 from UDM 158 (via an Nudm_SubscriptionGet procedure), which identifies that data session continuity for the DNN ims.com is not allowed ('PduTxToBSimEnabled=False') with respect to the Buddy SIM of USIM-2 132.2/SUPI-2, which is USIM-1 132.1 in this example. An N4 session is also established between the SMF 154 and UPF 160 for the USIM-2 132.2 PDU session, as shown at 211d.

Continuing with the present example, consider at 212 that USIM-2 132.2 is switched to the idle mode USIM-1 132.1 is switched to the connected mode at 213 such that, at 214a, consider that UE 110 via USIM-1 132.1 initiates a PDU session establishment request to AMF 154 for the DNN internet.com for a data session to be established for the Internet data network 170.1 (not shown in FIGS. 2A-2C).

In some instances, selection of a SMF and a UPF or, more generally, a network slice, can be facilitated by embodiments herein. For example, as discussed above at 206, SMF 154 can provide an indication to NRF 164 indicating that it supports the data session continuity capability to perform data session continuity operations as discussed herein. The capability information can be stored as NF discovery or query parameters for NRF 164 such that during PDU session establishment for UE 110, AMF 152 can query NRF 164, as shown at 215a in at least one embodiment via an Nnrf_NF-Discovery exchange in which the NF Discovery message includes query parameters (QueryParam) identifying the data session continuity capability (e.g., via the (BuddySimFeatures' capability indication). NRF can provide the information for AMF 152 indicating its data session continuity capability, which enables AMF 152 to identify/select SMF 154 at 215b to handle one or more PDU session(s) for UE 110 via USIM-1 132.1. It is to be understood that other labels for the capability indication can be utilized in accordance with embodiments herein.

Following the selection of SMF 154 by AMF 152, AMF 152 forwards the PDU session establishment request to SMF 154, as shown at 214b, which triggers the SMF 154 as shown at 214c to obtain the first subscription information associated with USIM-1 132.1/SUPI-1 from UDM 158, which identifies that data session continuity for the DNN internet.com is allowed ('PduTxToBSimEnabled=True') with respect to the BuddySIM of USIM-1 132.1, which is USIM-2 132.2 in this example. An N4 session is also established between the SMF 154 and UPF 160 for the USIM-1 132.1 PDU session, as shown at 214d. Although not shown in FIG. 1, in at least one embodiment, SMF 154 can select UPF 160 based on the UPF 160 indicating a data session continuity capability to NRF 164 and the SMF 154 discovering the capability via an exchange with the NRF 164 similar to that as discussed above at 215a and 215b involving AMF 152 discovery/selection of SMF 154.

Thus, registration and parallel data sessions can be established for the WWA single Rx/Tx, MUSIM UE 110, as shown in FIGS. 2A-2C through which both the AMF 152 and SMF 154 may obtain subscription information for the UE identifying whether session continuity is allowed or is not allowed for one or more DNNs for each of the subscriptions associated with USIM-1 132.1 and USIM-2 132.2.

As shown at 216, consider that data transfer/communications for data traffic associated with the Internet data network 170.1 is in progress between UE 110 and UPF 160 such that the USIM-1 132.1 is in the connected mode utilizing the WWA RF transceiver 124 for the communications and USIM-2 132.2 is in the idle mode or state.

While the UE 110 via USIM-1 132.1 is involved in the communications with the Internet data network 170.1, consider for the present example that a voice call that can be taken up by the UE 110 is triggered for USIM-2 132.2, at 217, via the IMS data network 170.2 (not shown in FIGS. 2A-2C) in which PCF 156 initiates a notification towards UE 110 via an Npcf_SMPolicyCreate_Notify message at 218a. SMF 154 continues the notification to AMF 152 at 218b via a Namf_comm_N1N2MessageTransfer communication and AMF 154 triggers paging toward the UE 110/USIM-2 132.2 via gNodeB 142, as shown at 218c and 218d.

As noted above, with current implementations if a UE chooses to pick an incoming call on a second USIM over an ongoing data session for a first USIM, then the ongoing data session for the first USIM would end. However, in accordance with embodiments herein, UE 110 may select to accept the incoming call for the IMS data network 170.2, as shown at 219.

Since UE 110 is a WWA single Rx/Tx device, the first PDU session and the second PDU session can continue on only one USIM at a time. By selecting to accept the incoming call at 219, the UE 110 is allowed to select a priority between multiple sessions. For example, selecting the incoming call at 219 on USIM-2 132.2 makes USIM-2 132.2 the priority USIM for UE 110 in this example. In various embodiments, the selection at 219 may include a selection by a user operating UE 110 to accept the call, based on settings or configuration provided for UE 110 (e.g., user settings, etc.), combinations thereof, and/or the like.

Once a priority USIM is determined by the UE 110, a session transfer procedure can be performed for the ongoing data session(s) for which data session continuity is allowed for the non-priority USIM, such as USIM-1 132.1 in this example. For example, following the selection at 219, UE 110 via USIM-2 132.2 communicates a service request toward AMF 152 via gNodeB 142, as shown at 220a and 220b. Upon obtaining the service request, AMF 152, at 221, checks the subscription information for SUPI-1 for the PDU session involving the Internet data network 170.1 (identified in the subscription information in this example as DNN internet.com) for USIM-1 132.1 (e.g., the non-priority USIM) to determine that data session continuity is allowed for the PDU session with respect to USIM-2 132.2.

Based on the determination that data session continuity is allowed with respect to the BuddySIM, USIM-2 132.2 in this example, for the PDU session involving the Internet data network 170.1 on USIM-1 132.1, AMF 152 initiates a PDU session and UE context transfer from USIM-1 132.1 to USIM-2 132.2 so that the UE 110 via USIM-2 132.2 can continue communications for the Internet data network 170.1 data traffic.

The AMF 152 retrieves service parameters from the SMF 154 for the PDU session involving the Internet data network 170.1 on USIM-1 132.1 to facilitate session continuity of the PDU session to the BuddySIM USIM-2 132.2. For example, at 222 as shown in FIG. 2C, the AMF 152 initiates retrieval of the service parameters for the PDU session by communicating an Nsmf_SM_ContextUpdate message to the SMF 154 including a data session continuity context retrieval information element (IE) or flag, referred to herein using the label 'BuddySimUsage', to indicate that service parameters are sought for one or more ongoing PDU session(s) currently handled by the SMF 154 that are to be transferred to the BuddySIM for UE 110. Per 3GPP standards, the SM_ContextUpdate can include the resource created in the SMF 154 using an smContextRef value specific to the PDU session to identify the session to the SMF for which the service parameters are sought. It is to be understood that the label 'BuddySimUsage' for the data session continuity context retrieval IE or flag is provided for illustrative purposes only and is not meant to limit the broad scope of the present disclosure. Other labels can be envisioned.

Recall, SMF 154 obtained the first subscription information for USIM-1/SUPI-1 for the PDU session involving the Internet data network 170.1 from UDM 158 as part of the PDU session creation, as discussed above at 214c, in which the first subscription information identifies that data session continuity for DNN internet.com is allowed ('PduTxToBSimEnabled=True'). SMF 154, upon receiving the message from AMF 152 at 222, cross-verifies with the first subscription information that it has obtained for the SUPI-1 from the UDM 158 to confirm that data session continuity is allowed for the PDU session, as shown at 223. Upon confirming that data session continuity is allowed for the PDU session involving USIM-1/SUPI-1, the SMF 154 responds to the AMF 152, at 224, via an Nsmf_SMContext_Update Response message including the service information for the PDU session.

In various embodiments, service information for a PDU session can include uplink (UL) quality of service (QoS) parameters, one or more filter parameters, and/or the like for the USIM-1 PDU session that can enable the USIM-2 to continue communications for the PDU session involving the Internet data network 170.1. In some embodiments, filter parameters for a PDU session may be provided within a Traffic Flow Template (TFT) for the PDU session that includes various parameters that can be used to identify an uplink flow, such as a remote IP address (IPv4 or IPv6), a remote port/port type, a local port/identifier, service type, traffic class, security parameters, and/or the like. In some embodiments, service information for a particular PDU session may also include an IP address, port number, tunnel endpoint identifier (TEID) information, and/or the like identifying the UPF that is handling the session.

In some embodiments, obtaining the indication by the SMF 154 that data session continuity is sought for one or more PDU session(s) may also be utilized by the SMF 154, at 217, to trigger optimized and/or differentiated charging capabilities at the CHF 162 for using the BuddySIM feature for the one or more PDU session(s) (e.g., a fee may be applied to the PDU session for using the BuddySIM features described herein). In some embodiments, optimized/differentiated charging can be based on an operator configuration for the mobile core network 150 and/or within subscription information for a given UE. For example, as shown at 225, SMF 154 can initiate an update request process with CHF 162 via a CHFUpdateRequest message that indicates UE 110 is to utilize enhanced data session continuity features via a 'BuddySimUsageOptimizedCharging' charging indication that is set to 'Enable', True, etc. that can trigger optimized/differentiated charging for the PDU sessions involving UE 110 in at least one embodiment. It is to be understood that other labels for the charging indication can be utilized in accordance with embodiments herein.

Continuing with the present example, upon obtaining the service information by the AMF 152 (at 224) for the PDU session for the Internet data network 170.1 involving USIM-1 132.1, the service information is sent to the UE 110 via the USIM-2 132.2, as shown at 226 or 227 (discussed below), to complete the session transfer to the USIM-2 132.2 such that the USIM-1 132.1 is in the idle mode, as shown at 228 and the USIM-2 132.2 is in the connected mode, as shown at 229. While in the connected mode, the data traffic for the PDU session involving the Internet data network 170.1 is continued for the UE 110 via USIM-2 132.2, as shown at 230. Further, voice traffic for the voice call of the PDU session involving the IMS data network 170.2 is also communicated by the UE 110 via USIM-2 132.2, as shown at 231.

In one embodiment, as shown at 226, service information for a PDU session for which data session continuity is allowed with respect to a BuddySIM, such as the PDU session involving the Internet data network 170.1 in this example, can be sent to a UE/BuddySIM, such as UE 110/USIM-2 132.2 in this example, using a Service Accept message that includes the service information for the PDU session that is to be transferred to the BuddySIM.

In another embodiment, as shown at 227, service information for a PDU session for which data session continuity is allowed with respect to a BuddySIM, such as the PDU session involving the Internet data network 170.1 in this example, can be sent to a UE/BuddySIM, such as UE 110/USIM-2 132.2 in this example, using a vendor specific message, referred to herein using a label 'BuddySimUpdateRequest', that includes the service information for the PDU session that is to be transferred to the BuddySIM. For example, in some instances, using a Service Accept message to communicate service information may not be desirable and/or may not be capable of carrying service information based on an operator configuration option. It is to be understood that the label 'BuddySimUpdateRequest' for the message containing service information for a PDU session for which data session continuity is allowed is provided for illustrative purposes only and is not meant to limit the broad scope of the present disclosure. Other labels can be envisioned.

For embodiments in which multiple PDU sessions may be transferred to a given USIM, service information for the multiple sessions can be included in a Service Accept message or a vendor specific message.

While it may be desirable to have a same AMF for both USIMs involving in a BuddySIM session transfer, AMF redirection can be performed in some instances to support such session transfer using similar processes such that UE context/service information can be exchanged between a source AMF and a target AMF. In one embodiment, IP address continuity for UE 110 for the session transfer can be achieved through Session and Service Continuity (SSC) Mode 1, if implemented for a deployment. For example, under the assumption that both USIM-1 132.1 and USIM-2 are associated with a same operator/service provider, then IP address continuity is easily achieved for UE 110 under SSC Mode 1. For cases involving different operators/service providers, IP address continuity can also be maintained based on operator/service provider agreements.

Accordingly, FIGS. 2A-2C illustrate that data session continuity for parallel PDU sessions involving a WWA single Rx/Tx, MUSIM UE, such as UE 110, can be provided through which an ongoing PDU session for which data session continuity is allowed can be transferred from a first USIM to a second USIM to continue communications for the ongoing PDU session when the first USIM is switched to the idle mode while the second USIM is in the connected mode.

It is to be understood that the example of FIGS. 2A-2B is provided for illustrative purposes only any combination of allowing/not allowing session continuity may be allowed. For example, session continuity for a first session and a second session could both not be allowed, session continuity for a first session could be allowed and session continuity for a second session could be not allowed, session continuity for a first session could be not allowed and session continuity for a second session could be allowed, or session continuity for a first session and a second session could be allowed. For instances, in which session continuity is allowed for both a second session and a second session, the selection of the priority USIM regarding which session to transfer could be based on the priority selection of the UE.

Figure 3A:
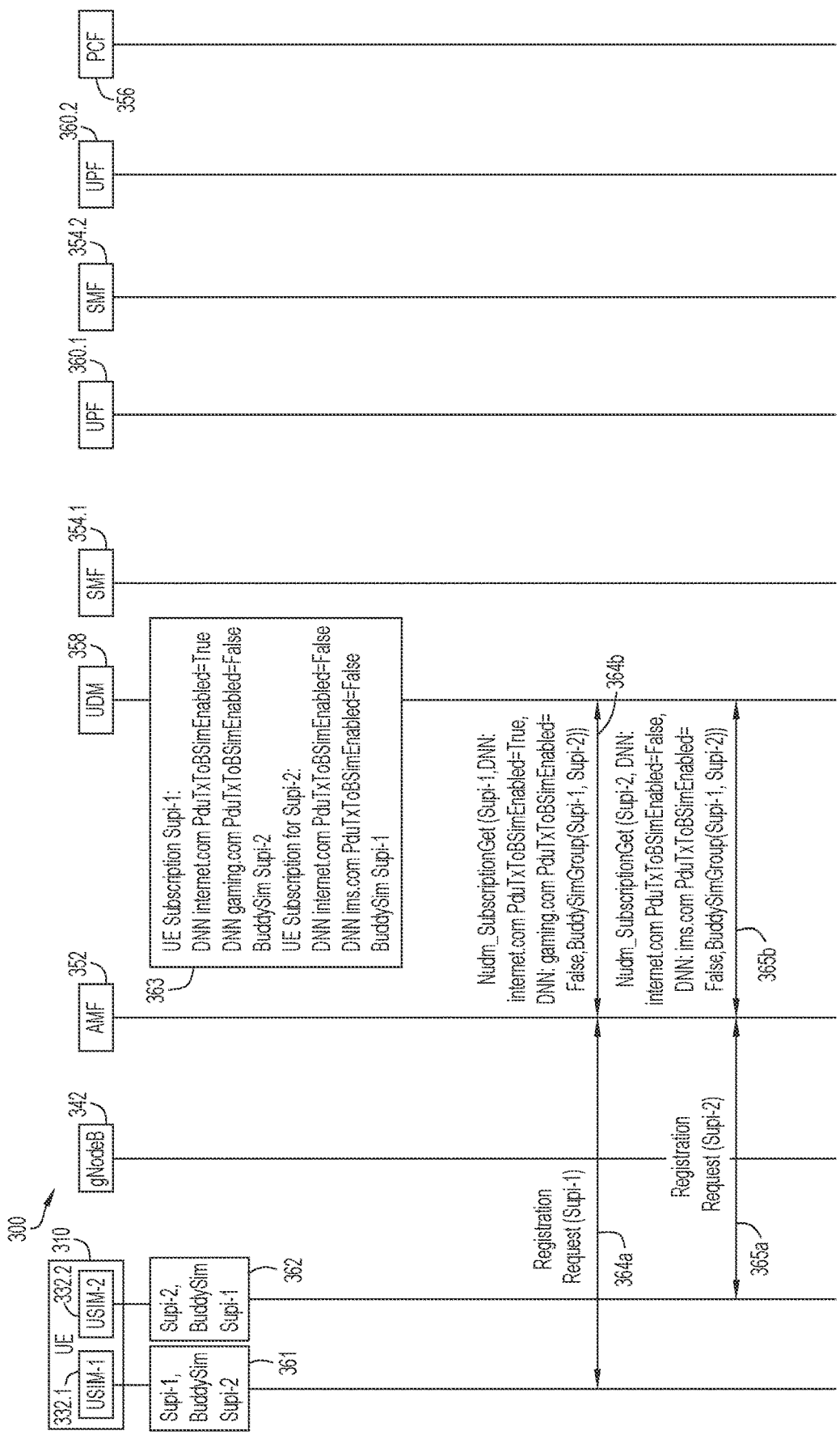
FIGS. 3A, 3B, and 3C are another message sequence diagram illustrating another call flow associated with providing data session continuity for parallel data sessions involving a MUSIM UE, according to an example embodiment.
Figure 3B:
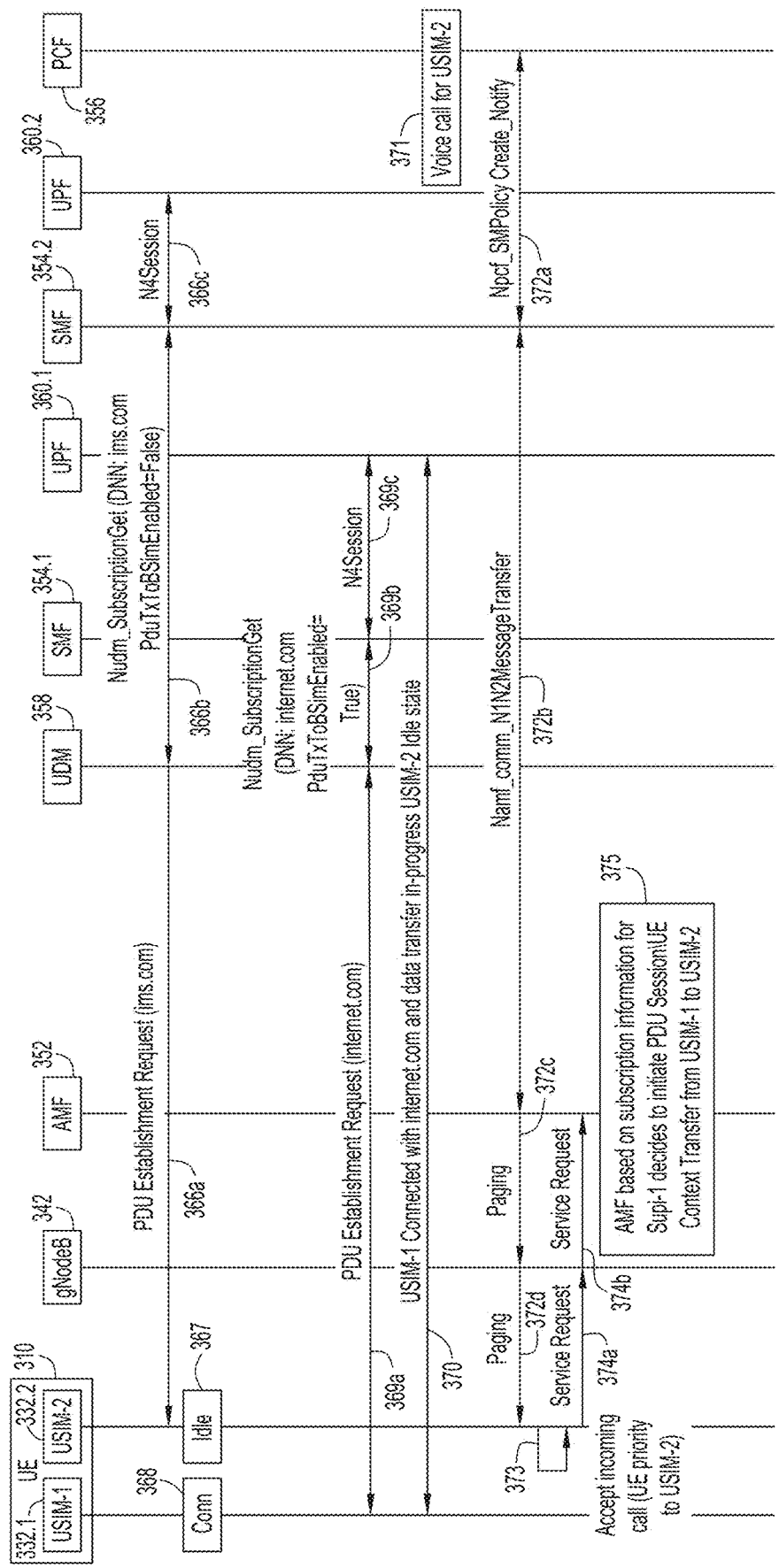
Figure 3C:
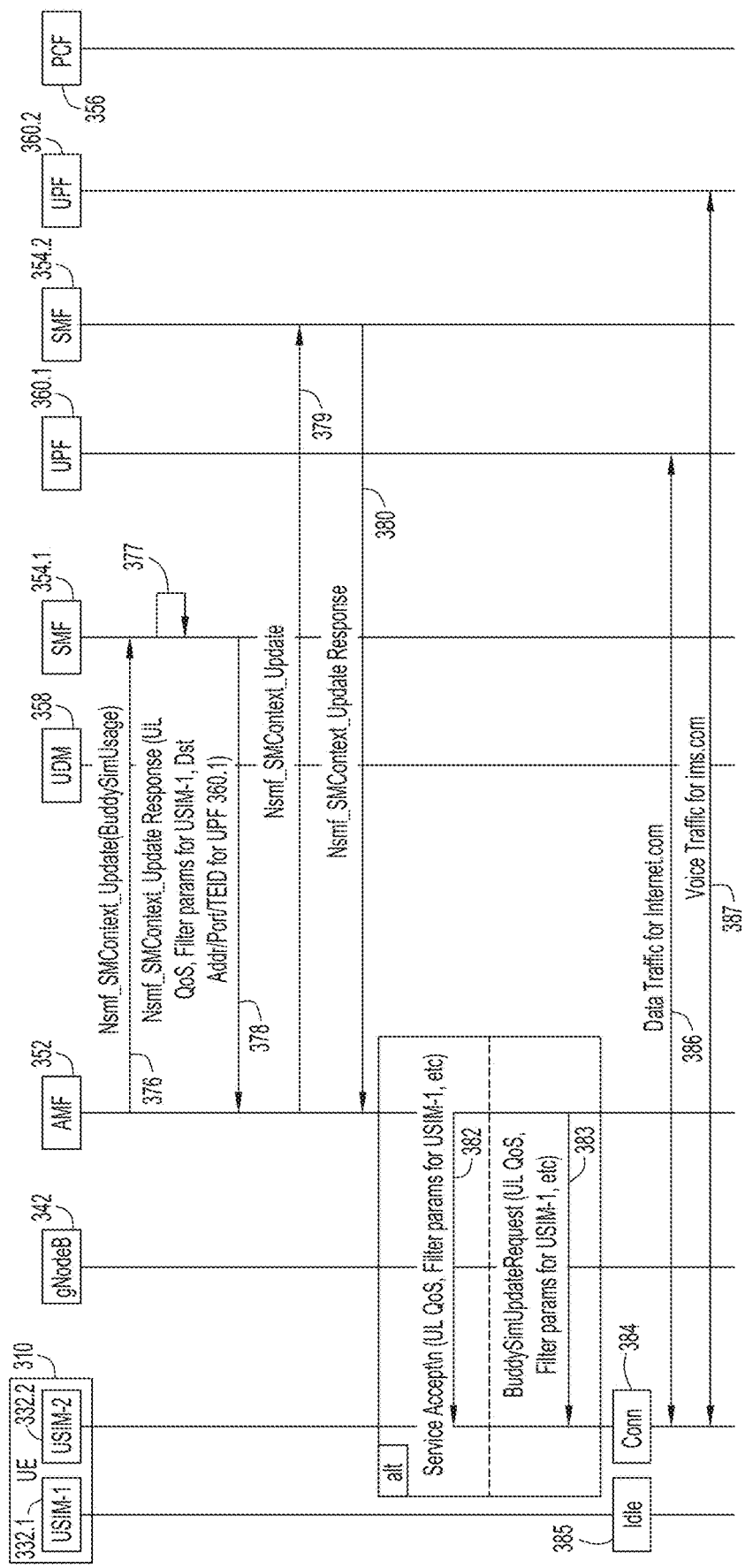

In some instances, multiple parallel PDU sessions for a UE may involve different SMFs and may be anchored at different UPFs, however, techniques as discussed above for FIGS. 2A-2C can be extended to such use cases, as discussed herein below with reference to FIGS. 3A, 3B, and 3C, in which FIGS. 3A, 3B, and 3C are a message sequence diagram illustrating a call flow 300 associated with providing data session continuity for parallel PDU sessions involving a WWA single Rx/Tx, MUSIM UE, according to an example embodiment. FIGS. 3A-3C includes a WWA single Rx/Tx, MUSIM UE 310, which includes a first USIM 332.1 and a second USIM 332.2, a gNodeB 342, an AMF 352, a UDM 358, a first SMF 354.1, a second SMF 354.2, a first UPF 360.1, a second UPF 360.2, and a PCF 356. Each of the elements discussed with reference to FIGS. 3A-3C may be configured and/or interface as discussed above for analogous ones of the elements discussed for FIG. 1.

As shown at 361, USIM-1 332.1 is associated with a first subscription identifier for UE 310, such as SUPI-1 for a first subscription for UE 310 and USIM-2 132.2 is associated with a second SUPI, SUPI-2, for a second subscription for UE 310, as shown at 362. As shown at 301 and 302, both of USIM-1 332.1 and USIM-2 332.2 are configured to be Buddy SIMs of each other for UE 310 such that the SUPI-2 is identified as the BuddySIM for USIM-1 332.1/SUPI-1 (301) and SUPI-1 is identified as the BuddySIM for USIM-2 332.2/SUPI-2 (302).

As shown at 363, UDM 358 includes subscription information for UE 310 both of USIM-1 332.1 for the first subscription for UE 310 and USIM-2 332.2 for the second subscription for UE 310. The subscription information includes BuddySIM group details indicating that SUPI-1 (corresponding to USIM-1) and SUPI-2 (corresponding to USIM-2) are the BuddySIM group for UE 310. For example, the first subscription associated with SUPI-1 identifies (among other information discussed in further detail below) that the BuddySIM SUPI associated with the first subscription is SUPI-2 corresponding to USIM-2 332.2 and that the BuddySIM SUPI associated with the second subscription is SUPI-1 corresponding to USIM-1 332.1. Thus, the BuddySIM group for the UE 310 subscriptions includes SUPI-1 (corresponding to USIM-1 332.1) and SUPI-2 (corresponding to USIM-2 332.2) for this example.

Further, the subscription information configured at 363 identifies, for the first subscription associated with SUPI-1, that a PDU session for DNN internet.com can be transferred to the BuddySIM, USIM-2 332.2 in this example corresponding to SUPI-2, as identified in the first subscription, by setting the data session continuity flag for DNN internet.com to be 'PduTxToBSimEnabled=True', whereas the first subscription identifies that a PDU session for DNN gaming.com cannot be transferred to the BuddySIM (USIM-2 332.2) by setting the data session continuity flag for DNN gaming.com to be 'PduTxToBSimEnabled=False'.

The subscription information for UE 310 for the present example at 363 further identifies, for the second subscription associated with SUPI-2, that a PDU session for DNN internet.com cannot be transferred to the BuddySIM, USIM-1 332.1 in this example corresponding to SUPI-1, as identified in the second subscription, by setting the data session continuity flag for DNN internet.com to be 'PduTxToBSimEnabled=False' and also that a PDU session for DNN ims.com can also not be transferred to the BuddySIM (USIM-1 332.1) by also setting the data session continuity flag for DNN gaming.com to be 'PduTxToBSimEnabled=False'.

Continuing to 364a and 364b, the UE 310 via USIM-1 332.1 may initiate a registration request for the first subscription of UE 310 with AMF 352, which authenticates UE 310 for the first subscription and obtains the first subscription information for SUPI-1 via UDM 358. The first subscription information for SUPI-1, as discussed above at 363, includes the data session continuity information for DNN internet.com indicating that data session continuity is allowed ('PduTxToBSimEnabled=True') with respect to the BuddySIM, USIM-2 332.2 in this example, and for DNN gaming.com indicating that data session continuity is not allowed ('PduTxToBSimEnabled=False') with respect to the BuddySIM, USIM-2 332.2. The BuddySIM group information for UE 310 is also identified to the AMF 352 along with the first subscription information.

At 365a and 365b, the UE 310 via USIM-2 332.2 initiates a registration request for the second subscription of UE 310 with AMF 352, which authenticates UE 310 for the second subscription and obtains the second subscription information for SUPI-2 via UDM 358. The second subscription information for SUPI-2, as discussed above at 363, includes the data session continuity information for DNN internet.com indicating that a data session continuity is not allowed ('PduTxToBSimEnabled=False') with respect to the BuddySIM, USIM-1 332.1 in this example, and also for DNN ims.com indicating that data session continuity is not allowed ('PduTxToBSimEnabled=False') with respect to the BuddySIM, USIM-1 332.1. The BuddySIM group information for UE 310 is also identified to the AMF 352 along with the second subscription information. It is to be understood that the order of registrations involving USIM-1 332.1 and USIM-2 332.2 can be performed in any order.

Continuing to 366a as shown in FIG. 3B, consider that UE 310 via USIM-2 332.2 initiates a PDU session establishment request to the second SMF 354.2 for the DNN ims.com for a data session to be established for an IMS data network (not shown in FIG. 3B). Obtaining the PDU session request triggers SMF 354, at 366b, to obtain the second subscription information associated with USIM-2 332.2/SUPI-2 from UDM 358, which identifies that data session continuity for the DNN ims.com is not allowed ('PduTxToBSimEnabled=False') with respect to the BuddySIM of USIM-2 332.2, which is USIM-1 332.1 in this example. An N4 session is also established between the second SMF 354.2 and the second UPF 360.2 for the USIM-2 332.2 PDU session, as shown at 366c.

Continuing to 367, consider for the present example, that USIM-2 332.2 is in an idle mode and USIM-1 332.1 is in a connected mode, as shown at 368, such that, at 369a, UE 310 via USIM-1 332.1 initiates a PDU session establishment request to the first SMF 354.1 for DNN internet.com for a data session to be established for an Internet data network (not shown in FIG. 3B). At 369b, the first SMF 354.1 obtains the first subscription information associated with USIM-1 132.1/SUPI-1 from UDM 358, which identifies that data session continuity for the DNN internet.com is allowed ('PduTxToBSimEnabled=True') with respect to the BuddySIM of USIM-1 132.1/SUPI-1, which is USIM-2 332.2 in this example. An N4 session is also established between the first SMF 354.1 and the first UPF 360.1 for the USIM-1 332.1 PDU session, as shown at 369c.

Thus, registration and parallel data sessions can be established for the WWA single Rx/Tx, MUSIM UE 310, as shown in FIG. 3B through which the AMF 352 and both of the first SMFs 354.1 and the second SMF 354.2 may obtain subscription information for the UE identifying whether session continuity is allowed or is not allowed for one or more DNNs for each of the subscriptions associated with USIM-1 332.1 and USIM-2 332.2. Although not shown in FIG. 3B, AMF and/or SMF/UPF/slice selection can be performed to select corresponding network functions/slices for the UE 310 sessions based on the network functions/slices supporting a data session continuity capability (as discussed above for FIGS. 2A-2C) in order to perform various data session continuity operations discussed herein.

As shown at 370, consider that a data transfer/communications for data traffic associated with the Internet data network is in progress between UE 310 and the first UPF 360.1 for the Internet data network (internet.com).

While the UE 310 via USIM-1 332.1 is involved in the communications with the Internet data network, consider for the present example that a voice call that can be taken up by the UE 310 is triggered for USIM-2 332.2, at 371, via the IMS data network in which PCF 356 initiates a notification towards UE 310 at 372a, which involves the second SMF 354.2 at 372b, and causes the AMF 352 via gNodeB 342 to page the UE 310/USIM-2 332.2, as shown at 372c and 372d.

As shown at 373, UE 310 may select to accept the incoming call for the IMS data network. Selecting to accept the incoming call at 373 on USIM-2 332.2 makes USIM-2 332.2 the priority USIM for UE 310. Once the priority USIM is determined by the UE 310, a session transfer procedure can be performed for the ongoing data session(s) for which data session continuity is allowed for the non-priority USIM, such as USIM-1 332.1 in this example.

For example, following the selection at 373, UE 310 via USIM-2 332.2 communicates a service request toward AMF 352 via gNodeB 342, as shown at 374a and 374b. Upon obtaining the service request, AMF 352, at 375, checks the subscription information for SUPI-1 for the PDU session involving the Internet data network for USIM-1 332.1 to determine that data session continuity is allowed for the PDU session with respect to USIM-2 332.2.

Based on the determination that data session continuity is allowed with respect to the BuddySIM, USIM-2 332.2 in this example, for the PDU session involving the Internet data network on USIM-1 332.1, AMF 352 initiates a PDU session and UE context transfer from USIM-1 332.1 to USIM-2 332.2 so that the UE 310 via USIM-2 332.2 can continue communications for the Internet data network data traffic.

At 376 of FIG. 3C, the AMF 352 initiates retrieval of the service parameters for the PDU session by communicating an Nsmf_SM_ContextUpdate message to the first SMF 354.1 including the data session continuity context retrieval IE or flag ('BuddySimUsage') to indicate that service parameters are sought the PDU session. The first SMF 354.1, upon receiving the message, cross verifies with the first subscription information that it has obtained for the SUPI-1 from the UDM 358 to confirm that data session continuity is allowed for the PDU session, as shown at 377. Upon confirming that data session continuity is allowed for the PDU session involving USIM-1/SUPI-1, the first SMF 354.1 responds to the AMF 352, at 378, via an Nsmf_SM-Context_Update Response message including the service information for the PDU session. Service information for the PDU session can include UL QoS parameters, one or more filter parameters, and/or the like along with an IP address, port number, TEID information, and/or the like identifying the first UPF 360.1 that is handling the PDU session. Optimized/differentiated charging for the PDU session can also be triggered for the first SMF 354.1 in accordance with embodiments described herein.

At 379 and 380, another context update/response procedure is performed between the AMF 352 and the second SMF 354.2 regarding the second data session according to standards-based signaling.

Upon obtaining the service information by the AMF 352 (at 378) for the PDU session for the Internet data network involving USIM-1 332.1, the service information is sent to the UE 310 via the USIM-2 332.2, as shown at 382 (using a Service Accept message) or 383 (using the vendor specific 'BuddySimUpdateRequest' message), to complete the session transfer to the USIM-2 232.2 such that the USIM-2 332.2 is in the connected mode, as shown at 384, and the USIM-1 is in the idle mode, as shown at 385. While in the connected mode, the data traffic for the PDU session involving the Internet data network is continued for the UE 310 via USIM-2 332.2, as shown at 386. Further, voice traffic for the voice call of the PDU session involving the IMS data network is also communicated by the UE 310 via USIM-2 332.2, as shown at 387.

Accordingly, FIGS. 3A-3C illustrate that data session continuity for parallel PDU sessions involving a WWA single Rx/Tx, MUSIM UE, such as UE 310, can be provided for implementations involving different SMF/UPF combinations though which an ongoing PDU session handled via a first SMF/UPF and for which data session continuity is allowed can be transferred from a first USIM to a second USIM to continue communications for the ongoing PDU session when the first USIM is switched to the idle mode while the second USIM is in the connected mode While the examples of FIGS. 2A-2C and 3A-3C involve two USIMs for a UE, it is to be understood that techniques described herein can also be extended to implementations involving UEs having more than two USIMs.

Figure 4:
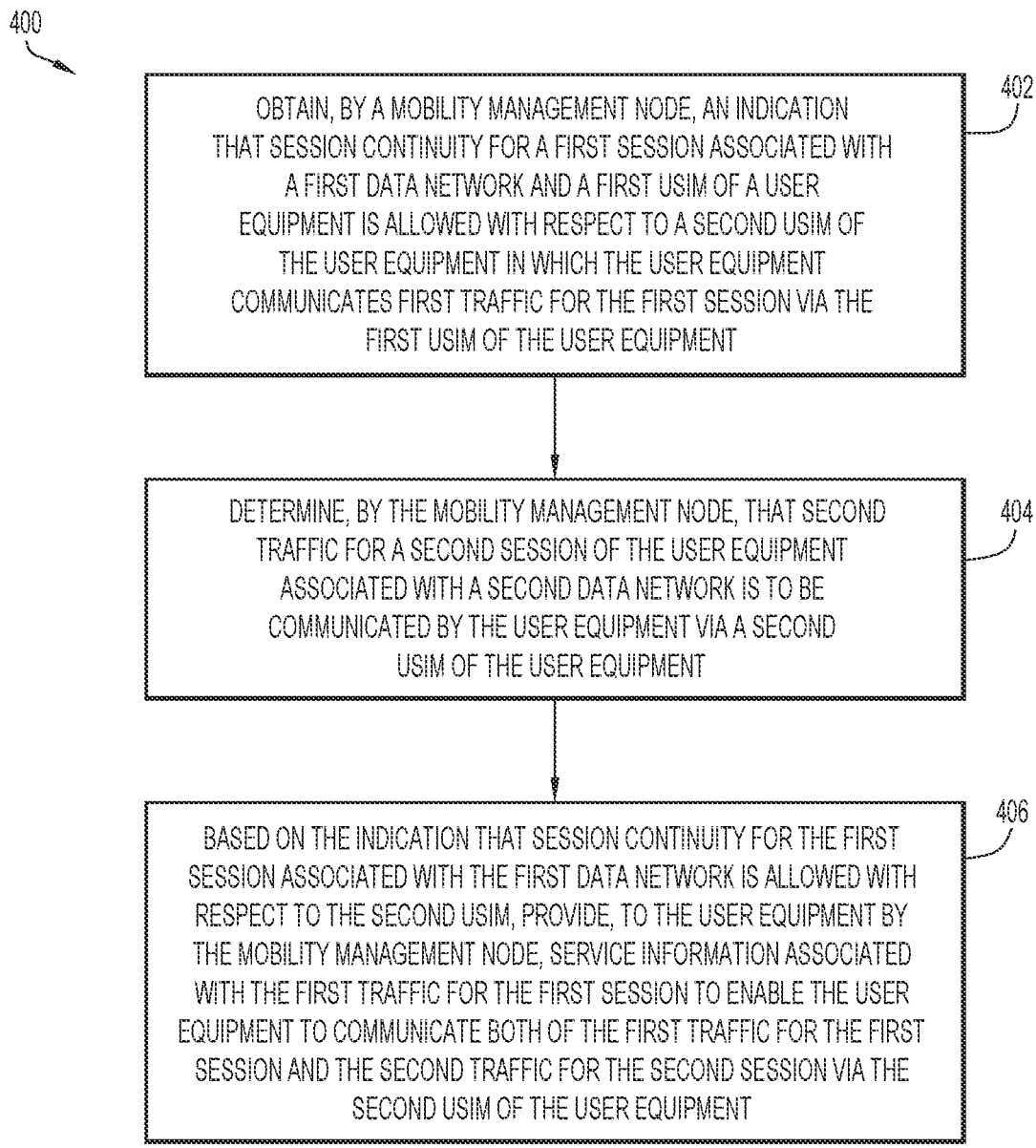
FIG. 4 is a flow chart depicting a method according to an example embodiment.

Referring to FIG. 4, FIG. 4 is a flow chart depicting a method 400 according to an example embodiment. In at least one embodiment, method 400 illustrates example operations that may be performed, at least in part, by an AMF, such as AMF 152 and/or AMF 352, in order to provide data session continuity for parallel data sessions involving a WWA (e.g., 5G/NR) single Rx/Tx, MUSIM UE, according to an example embodiment.

Consider, at 402 that the method may include obtaining, by a mobility management node (e.g., an AMF), an indication that session continuity for a first session associated with a first data network and a first USIM of a user equipment is allowed with respect to a second USIM of the user equipment in which the user equipment communicates first traffic for the first session via the first USIM of the user equipment. For example, the first USIM of the user equipment may be in the connected mode and involved in active communications with the first data network for the first session at a first point in time.

At 404, the method may include determining, by the mobility management node, that second traffic for a second session of the user equipment associated with a second data network is to be communicated by the user equipment via the second USIM of the user equipment. For example, at a second point in time later than the first point in time, the mobility management node can determine that there is an incoming call for the user equipment (e.g., from an IMS data network).

The first data network may be associated with a first data network name (DNN) and the second data network may be associated with a second data network name (DNN) that is different than the first DNN. In some instances, the first session and the second session can be anchored at the same user plane function (e.g., UPF 160, as shown in FIGS. 2A-2C). However, in other instances, the first session and the second session can be anchored at different user plane functions (e.g., UPF 360.1 and UPF 360.2, as shown in FIGS. 3A-3C).

At 406, based on the indication that session continuity for the first session associated with the first data network is allowed with respect to the second USIM, the method may include providing, to the user equipment by the mobility management node, service information associated with the first traffic for the first session to enable the user equipment to communicate both of the first traffic for the first session and the second traffic for the second session via the second USIM of the user equipment. For example, the mobility management node may gather the service information from a session management node (e.g., an SMF) handling the session and may communicate the gathered service information to the second USIM of the user equipment. The service information can be communicated to the user equipment using a service accept message or a vendor specific message.

Other operations may be performed in accordance with techniques herein. For example, in one instance the method may further include, configuring a subscription database with a first subscription associated with the first session and a second subscription associated with the second session in which the indication that session continuity for the first session associated the first data network is allowed for a user equipment with respect to the second USIM is included within the first subscription for the user equipment associated and wherein the first subscription includes an identifier for the second USIM. In one instance, the method may further include obtaining, by the mobility management node, the first subscription from the subscription database during a first registration of the user equipment involving the first USIM in which the indication that session continuity for the first session associated with the first data network is allowed for the user equipment with respect to the second USIM of the user equipment is included in the first subscription; and obtaining, by the mobility management node, the second subscription from the subscription database during a second registration of the user equipment involving the second USIM in which wherein the second subscription includes an indication that session continuity for the second session associated with the second data network is not allowed for the user equipment with respect to the first USIM.

Figure 5:
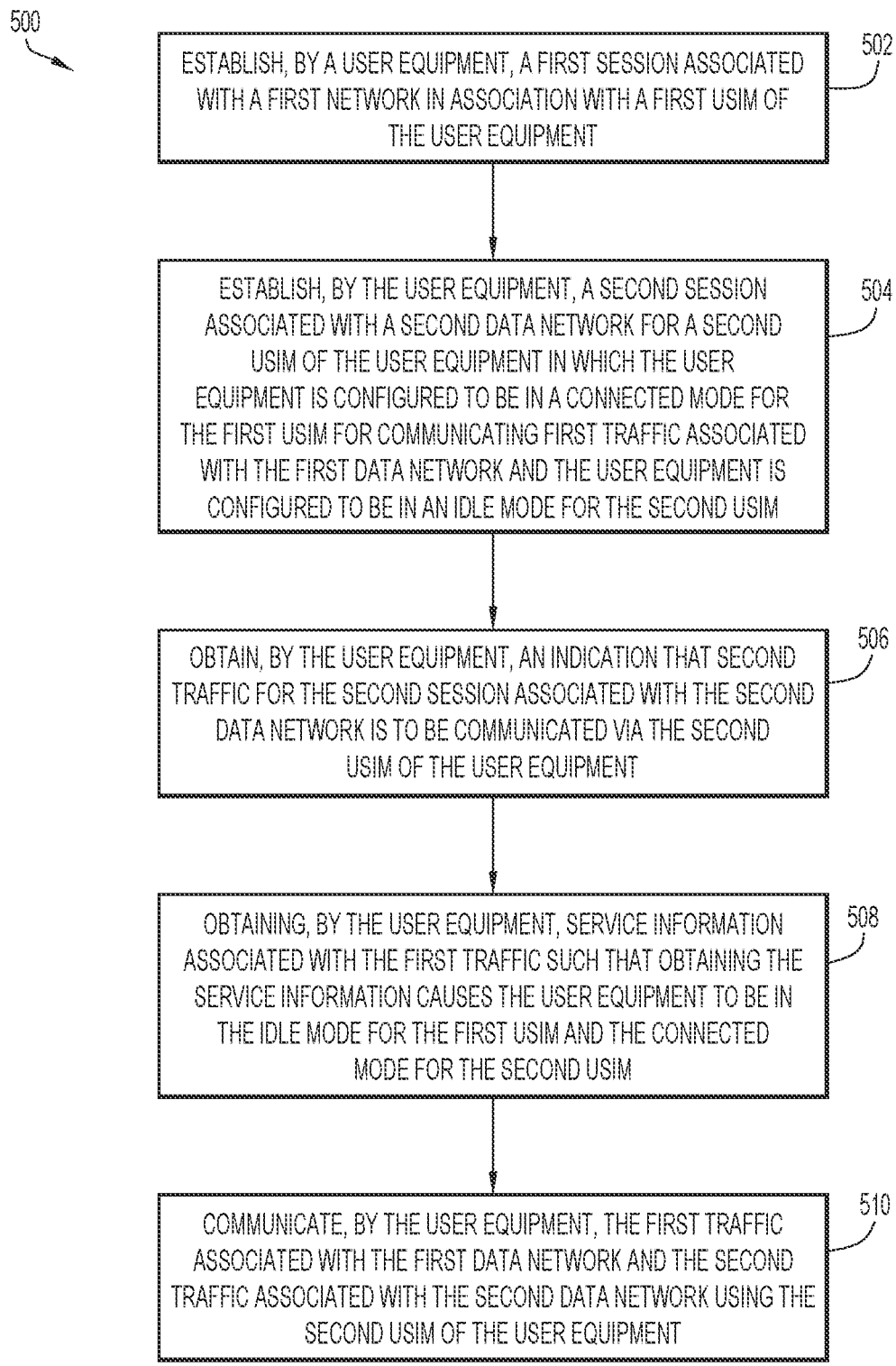
FIG. 5 is another flow chart depicting another method according to an example embodiment.

Referring to FIG. 5, FIG. 5 is a flow chart depicting another method 500 according to an example embodiment. In at least one embodiment, method 500 illustrates example operations that may be performed, at least in part, by a WWA (e.g., 5G/NR) single Rx/Tx, MUSIM UE, such as UE 110 and/or UE 310, in maintain data session continuity for multiple, parallel data sessions as discussed herein, according to an example embodiment.

At 502, the method may include establishing, by a user equipment, such as a WWA (e.g., 5G/NR) single Rx/Tx, MUSIM user equipment, a first session associated with a first data network for a first USIM of the user equipment.

At 504, the method may include establishing, by the user equipment, a second session associated with a second data network for a second USIM of the user equipment in which the user equipment is configured to be in a connected mode for the first USIM for communicating first traffic associated with the first data network and the user equipment is configured to be in an idle mode for the second USIM. For example, the user equipment may be in active communications with the first data network via the first USIM at a first point in time while no active communications are occurring with the second data network via the second USIM.

At 506, the method may include obtaining, by the user equipment, an indication that second traffic for a second session associated with the second data network is to be communicated via the second USIM of the user equipment. For example, the user equipment may receive a paging notification indicating an incoming call for the second data network.

At 508, the method may include obtaining, by the user equipment, service information associated with the first traffic (e.g., UL QoS, filter parameters, IP address, port, TEID of the UPF handling the first session associated with the first traffic) such that obtaining the service information causes the user equipment to be in the idle mode for the first USIM and the connected mode for the second USIM.

At 510, the method may include communicating, by the user equipment, the first traffic associated with the first data network and the second traffic associated with the second data network using the second USIM of the user equipment (e.g., via uplink/downlink communications via the second USIM and the single WWA RF transceiver of the user equipment).

Figure 6:
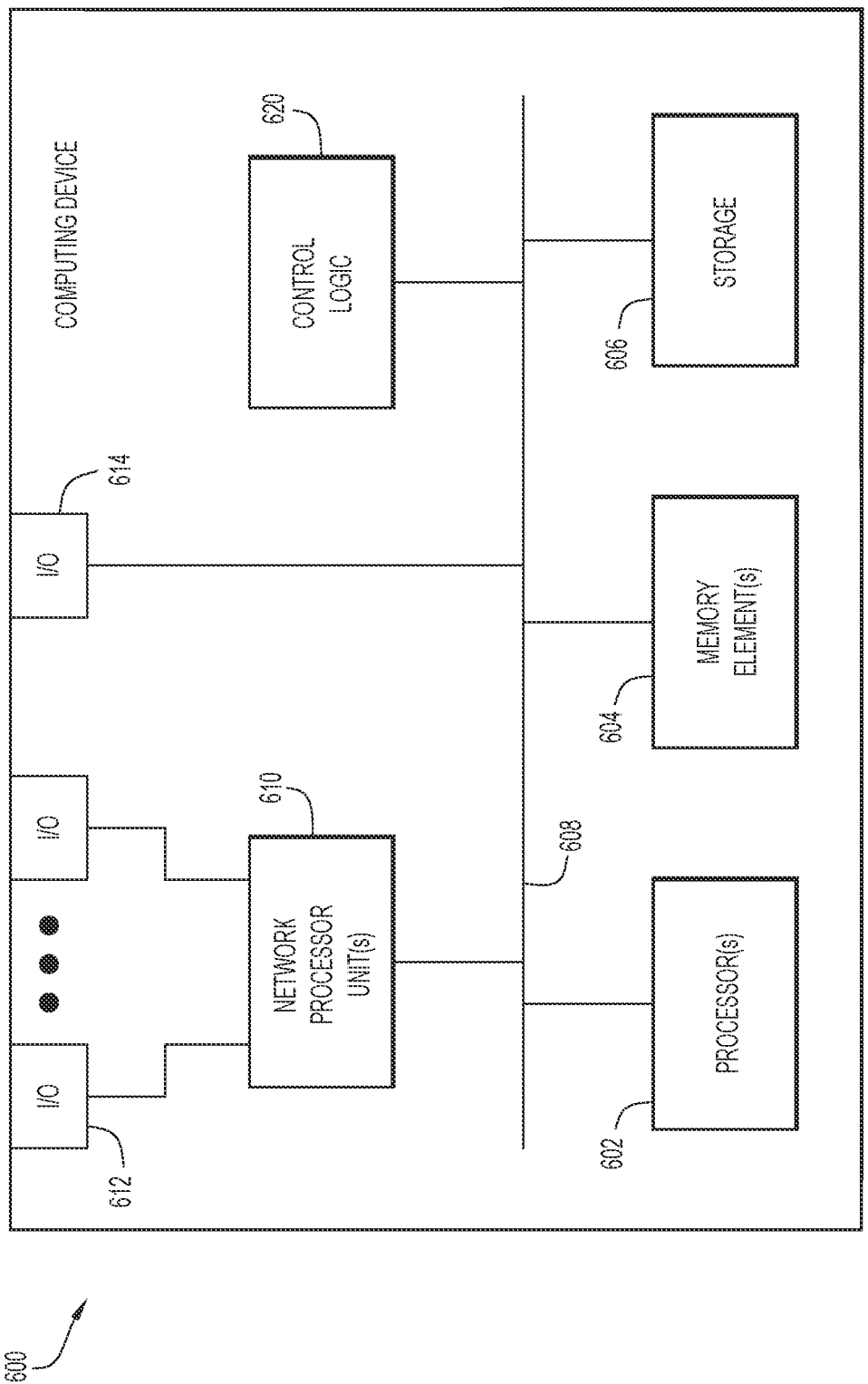
FIG. 6 is a hardware block diagram of a computing device that may perform functions associated with any combination of operations, in connection with the techniques discussed herein.

Referring to FIG. 6, FIG. 6 illustrates a hardware block diagram of a computing device 600 that may perform functions associated with operations discussed herein. In various embodiments, a computing device or apparatus, such as computing device 600 or any combination of computing devices 600, may be configured as any entity/entities as discussed herein in order to perform operations of the various techniques discussed herein, such as, for example, any of gNodeB 142, AMF 152, SMF 154, PCF 156, UDM 158, UPF 160, CHF 162, gNodeB 142, AMF 352, SMF 354.1, SMF 354.2, PCF 356, UDM 358, UPF 360.1, UPF 360.2, and/or any other network element discussed for embodiments herein.

In at least one embodiment, computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., hardware processor(s)) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 620 can include instructions that, when executed, cause processor(s) 602 to perform operations including obtaining, by a mobility management node, such as an AMF, an indication that session continuity for a first session associated with a first data network and a first USIM is allowed for a user equipment with respect to a second USIM of the user equipment, wherein the user equipment communicates first traffic for the first session via the first USIM of the user equipment; determining that second traffic for a second session of the user equipment associated with a second data network is to be communicated by the user equipment via the second USIM of the user equipment; and based on the indication that session continuity for the first session associated with the first data network is allowed with respect to the second USIM, providing, to the user equipment, service information associated with the first traffic for the first session to enable the user equipment to communicate both of the first traffic for the first session and the second traffic for the second session via the second USIM of the user equipment.

For embodiments in which computing device may 600 may be configured as a gNodeB, the computing device may further include one or more WWA RF transceiver(s) and WWA baseband processor(s)/modem(s) and, in some instances, one or more WLA RF transceiver(s) and WLA baseband processor(s)/modem(s), as discussed herein to facilitate over the RF communications.

The programs described herein (e.g., control logic 620 of computing device 600 and control logic 128 of UE 110) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 114 of UE 110 and memory element(s) 604 of computing device 600) and/or storage (e.g., storage 116 of UE 110 and storage 606 of computing device 600) can store data, software, code, instructions (e.g., processor instructions), logic, parameters, combinations thereof, and/or the like used for operations described herein. This includes memory element(s) 114/604 and/or storage 114/606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a mobility management node, an indication that session continuity for a first session associated with a first data network and a first universal subscriber identity module (USIM) of a user equipment is allowed with respect to a second USIM of the user equipment, wherein the user equipment communicates first traffic for the first session via the first USIM of the user equipment; determining that second traffic for a second session of the user equipment associated with a second data network is to be communicated by the user equipment via the second USIM of the user equipment; and based on the indication that session continuity for the first session associated with the first data network is allowed with respect to the second USIM, providing, to the user equipment, service information associated with the first traffic for the first session to enable the user equipment to communicate both of the first traffic for the first session and the second traffic for the second session via the second USIM of the user equipment.

In one instance, the method may further include configuring a subscription database with a first subscription associated with the first session and a second subscription associated with the second session, wherein the indication that session continuity for the first session associated the first data network is allowed for the user equipment with respect to the second USIM is included within the first subscription for the user equipment associated and wherein the first subscription includes an identifier for the second USIM.

In one instance, the method may further include obtaining, by the mobility management node, the first subscription from the subscription database during a first registration of the user equipment involving the first USIM, wherein the indication that session continuity for the first session associated with the first data network and the first USIM is allowed for the user equipment with respect to the second USIM of the user equipment is included in the first subscription; and obtaining, by the mobility management node, the second subscription from the subscription database during a second registration of the user equipment involving the second USIM, wherein the second subscription includes an indication that session continuity for the second session associated with the second data network and the second USIM is not allowed or is allowed for the user equipment with respect to the first USIM, wherein the subscription database is a Unified Data Management Element.

In one instance, the method may further include obtaining, by a Session Management Function (SMF) from the subscription database, the indication that session continuity for the first session associated with the first data network and the first USIM is allowed for the user equipment with respect to the second USIM of the user equipment; and obtaining, by the SMF from the subscription database, the indication that session continuity for the second session associated with the second data network and the second USIM is not allowed or is allowed for the user equipment with respect to the first USIM.

In one instance, the method may further include, upon obtaining, by the SMF, a request for the service information associated with the first traffic for the first session, providing, by the SMF, a charging indication to a Charging Function (CHF) to update charging for the user equipment.

In one instance, the method may further include, prior to the obtaining, selecting each of the mobility management node, a session management node, and a user plane node to handle the first session based on each of the mobility management node, the session management node, and the user plane node supporting a data session continuity capability. In one instance, an indication that the mobility management node supports the data session continuity capability is stored by a gNodeB and a Network Repository Function (NRF), wherein an indication that the session management node supports the data session continuity capability is stored by the NRF, and wherein an indication that the user plane node supports the data session continuity capability is stored by the NRF.

In one instance, the mobility management node is an Access and Mobility Management Function (AMF). In one instance, the first data network is associated with a first data network name (DNN) and the second data network is associated with a second data network name (DNN) that is different than the first DNN. In one instance, the first session and the second session are anchored at a same user plane function. In one instance, the first session is anchored at a first user plane function and the second session is anchored at a second user plane function that is different than the first user plane function.

In one instance, the service information includes one or more of: uplink quality of service information associated with the first traffic; one or more filter parameters associated with the first traffic; and user plane function information that identifies a user plane function that is handling the first traffic. In one instance, the service information is provided to the user equipment via a service accept message or a vendor specific message.

In one form, another computer-implemented method is provided that may include establishing, by a user equipment, a first session associated with a first data network for a first universal subscriber identity module (USIM) of the user equipment; establishing, by the user equipment, a second session associated with a second data network for a second USIM of the user equipment, wherein the user equipment is configured to be in a connected mode for the first USIM for communicating first traffic associated with the first data network and the user equipment is configured to be in an idle mode for the second USIM; obtaining, by the user equipment, an indication that second traffic for a second session associated with the second data network is to be communicated; and obtaining, by the user equipment, service information associated with the first traffic, wherein obtaining the service information causes the user equipment to be in the idle mode for the first USIM and the connected mode for the second USIM; and communicating, by the user equipment, the first traffic associated with the first data network and the second traffic associated with the second data network via the second USIM.

In one instance, a subscription for the user equipment includes first subscription information indicating that session continuity is allowed for performing a session transfer for the first session associated with the first data network with respect to the second USIM. In one instance, the subscription for the user equipment includes second subscription information indicating that session continuity is not allowed or is allowed for performing a session transfer for the second session associated with the second data network with respect to the first USIM.

In one instance, the user equipment is a single transmit/single receive mode multiple USIM user equipment. In one instance, the first data network associated with a first data network name (DNN) and the second data network is associated with a second data network name (DNN) that is different than the first DNN. In one instance, the service information includes one or more of: uplink quality of service information associated with the first traffic; one or more filter parameters associated with the first traffic; and user plane function information that identifies a user plane function handling the first traffic. In one instance, the service information is obtained by the user equipment via a service accept message or a vendor specific message. In one instance, the first traffic is data traffic and the second traffic is voice traffic.

In summary, techniques herein may provide data session continuity for multiple, parallel data sessions involving a WWA (e.g., 5G/NR) single Rx/Tx MUSIM UE.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining, by an Access and Mobility Management Function (AMF), an indication that session continuity for a first session associated with a first data network and a first universal subscriber identity module (USIM) of a user equipment is allowed with respect to a second USIM of the user equipment, wherein the user equipment communicates first traffic for the first session via the first USIM of the user equipment;

determining, by the AMF, that second traffic for a second session of the user equipment associated with a second data network is to be communicated by the user equipment via the second USIM of the user equipment; and based on the indication that session continuity for the first session associated with the first data network is allowed with respect to the second USIM, providing, to the user equipment by the AMF, service information associated with the first traffic for the first session including uplink quality of service information associated with the first traffic and one or more filter parameters associated with the first traffic to enable the user equipment to communicate both of the first traffic for the first session and the second traffic for the second session via the second USIM of the user equipment, wherein the service information is provided to the user equipment via a service accept message or a vendor specific message provided by the AMF following a service request being obtained by the AMF from the user equipment after the second session is established.

2. The method of claim 1, further comprising:

configuring a subscription database with a first subscription associated with the first session and a second subscription associated with the second session, wherein the indication that session continuity for the first session associated the first data network is allowed for the user equipment with respect to the second USIM is included within the first subscription for the user equipment associated and wherein the first subscription includes an identifier for the second USIM.

3. The method of claim 2, further comprising:

obtaining, by the AMF, the first subscription from the subscription database during a first registration of the user equipment involving the first USIM, wherein the indication that session continuity for the first session associated with the first data network and the first USIM is allowed for the user equipment with respect to the second USIM of the user equipment is included in the first subscription; and obtaining, by the AMF, the second subscription from the subscription database during a second registration of the user equipment involving the second USIM, wherein the second subscription includes an indication that session continuity for the second session associated with the second data network and the second USIM is not allowed or is allowed for the user equipment with respect to the first USIM, wherein the subscription database is a Unified Data Management (UDM) element.

4. The method of claim 3, further comprising:

obtaining, by a Session Management Function (SMF) from the subscription database, the indication that session continuity for the first session associated with the first data network and the first USIM is allowed for the user equipment with respect to the second USIM of the user equipment; and obtaining, by the SMF from the subscription database, the indication that session continuity for the second session associated with the second data network and the second USIM is not allowed or is allowed for the user equipment with respect to the first USIM.

5. The method of claim 4, further comprising:

upon obtaining, by the SMF, a request for the service information associated with the first traffic for the first session, providing, by the SMF, a charging indication to a Charging Function (CHF) to update charging for the user equipment.

6. The method of claim 1, further comprising, prior to the obtaining, selecting each of the AMF, a session management node, and a user plane node to handle the first session based on each of the AMF, the session management node, and the user plane node supporting a data session continuity capability.

7. The method of claim 6, wherein an indication that the AMF supports the data session continuity capability is stored by a gNodeB and a Network Repository Function (NRF), wherein an indication that the session management node supports the data session continuity capability is stored by the NRF, and wherein an indication that the user plane node supports the data session continuity capability is stored by the NRF.

8. The method of claim 1, wherein the first data network is associated with a first data network name (DNN) and the second data network is associated with a second data network name (DNN) that is different than the first DNN.

9. The method of claim 1, wherein the first session and the second session are anchored at a same user plane function.

10. The method of claim 1, wherein the first session is anchored at a first user plane function and the second session is anchored at a second user plane function that is different than the first user plane function.

11. The method of claim 1, wherein the service information further includes:

user plane function information that identifies a user plane function that is handling the first traffic.

12. The method of claim 1, wherein the first session of the user equipment and the second session of the user equipment are established prior to the determining by the AMF that the second traffic for the second session of the user equipment associated with the second USIM and the second data network is to be communicated by the user equipment and the determining is performed based, at least in part, on the AMF obtaining the service request via the second USIM the user equipment for the second session.

13. The method of claim 1, wherein the user equipment is in a connected mode for the first USIM and is in an idle mode for the second USIM while the user equipment communicates the first traffic for the first the first session via the first USIM prior to the determining by the AMF, and the user equipment is switched to the idle mode for the first USIM and to the connected mode for the second USIM while the user equipment communicates both the first traffic for the first session and the second traffic for the second session via the second USIM.

14. One or more non-transitory computer readable storage media encoded with instructions that, when executed by a processor, cause the processor to perform operations, comprising:
   obtaining, by an Access and Mobility Management Function (AMF), an indication that session continuity for a first session associated with a first data network and a first universal subscriber identity module (USIM) of a user equipment is allowed with respect to a second USIM of the user equipment, wherein the user equipment communicates first traffic for the first session via the first USIM of the user equipment;
   determining, by the AMF, that second traffic for a second session of the user equipment associated with a second data network is to be communicated by the user equipment via the second USIM of the user equipment; and
   based on the indication that session continuity for the first session associated with the first data network is allowed with respect to the second USIM, providing, to the user equipment by the AMF, service information associated with the first traffic for the first session including uplink quality of service information associated with the first traffic and one or more filter parameters associated with the first traffic to enable the user equipment to communicate both of the first traffic for the first session and the second traffic for the second session via the second USIM of the user equipment, wherein the service information is provided to the user equipment via a service accept message or a vendor specific message provided by the AMF following a service request being obtained by the AMF from the user equipment after the second session is established.

15. The media of claim 14, further encoded with instructions that, when executed by a processor, cause the processor to perform further operations, comprising:
   configuring a subscription database with a first subscription associated with the first session and a second subscription associated with the second session, wherein the indication that session continuity for the first session associated the first data network is allowed for the user equipment with respect to the second USIM is included within the first subscription for the user equipment associated and wherein the first subscription includes an identifier for the second USIM.

16. The media of claim 15, further encoded with instructions that, when executed by a processor, cause the processor to perform further operations, comprising:
   obtaining, by the AMF, the first subscription from the subscription database during a first registration of the user equipment involving the first USIM, wherein the indication that session continuity for the first session associated with the first data network and the first USIM is allowed for the user equipment with respect to the second USIM of the user equipment is included in the first subscription; and
   obtaining, by the AMF, the second subscription from the subscription database during a second registration of the user equipment involving the second USIM, wherein the second subscription includes an indication that session continuity for the second session associated with the second data network and the second USIM is not allowed or is allowed for the user equipment with respect to the first USIM, wherein the subscription database is a Unified Data Management (UDM) element.

17. A system comprising:
   at least one memory element for storing data; and
   at least one processor for executing instructions associated with the data, wherein executing the instructions causes the system to perform operations, comprising:
      obtaining, by an Access and Mobility Management Function (AMF), an indication that session continuity for a first session associated with a first data network and a first universal subscriber identity module (USIM) of a user equipment is allowed with respect to a second USIM of the user equipment, wherein the user equipment communicates first traffic for the first session via the first USIM of the user equipment;
      determining, by the AMF, that second traffic for a second session of the user equipment associated with a second data network is to be communicated by the user equipment via the second USIM of the user equipment; and
      based on the indication that session continuity for the first session associated with the first data network is allowed with respect to the second USIM, providing, to the user equipment by the AMF, service information associated with the first traffic for the first session including uplink quality of service information associated with the first traffic and one or more filter parameters associated with the first traffic to enable the user equipment to communicate both of the first traffic for the first session and the second traffic for the second session via the second USIM of the user equipment, wherein the service information is provided to the user equipment via a service accept message or a vendor specific message provided by the AMF following a service request being obtained by the AMF from the user equipment after the second session is established.

18. The system of claim 17, wherein executing the instructions causes the system to perform further operations, comprising:
   configuring a subscription database with a first subscription associated with the first session and a second subscription associated with the second session, wherein the indication that session continuity for the first session associated the first data network is allowed for the user equipment with respect to the second USIM is included within the first subscription for the user equipment associated and wherein the first subscription includes an identifier for the second USIM.

19. The system of claim 18, wherein executing the instructions causes the system to perform operations, comprising:
   obtaining, by the AMF, the first subscription from the subscription database during a first registration of the user equipment involving the first USIM, wherein the indication that session continuity for the first session associated with the first data network and the first USIM is allowed for the user equipment with respect to the second USIM of the user equipment is included in the first subscription; and
   obtaining, by the AMF, the second subscription from the subscription database during a second registration of the user equipment involving the second USIM, wherein the second subscription includes an indication that session continuity for the second session associated with the second data network and the second USIM is not allowed or is allowed for the user equipment with respect to the first USIM, wherein the subscription database is a Unified Data Management (UDM) element.

20. The system of claim 18, wherein executing the instructions causes the system to perform operations, comprising:

obtaining, by a Session Management Function (SMF) from the subscription database, the indication that session continuity for the first session associated with the first data network and the first USIM is allowed for the user equipment with respect to the second USIM of the user equipment;

obtaining, by the SMF from the subscription database, the indication that session continuity for the second session associated with the second data network and the second USIM is not allowed or is allowed for the user equipment with respect to the first USIM; and upon obtaining, by the SMF, a request for the service information associated with the first traffic for the first session, providing, by the SMF, a charging indication to a Charging Function (CHF) to update charging for the user equipment.

\* \* \* \* \*